United States Patent
Yoshioka et al.

(10) Patent No.: US 10,288,807 B2
(45) Date of Patent: May 14, 2019

(54) OPTICAL WAVEGUIDE HAVING CORE PARTIALLY FORMED IN S-SHAPE, AND POSITION SENSOR AND OPTICAL CIRCUIT BOARD INCLUDING THE SAME

(71) Applicant: NITTO DENKO CORPORATION, Ibaraki-shi, Osaka (JP)

(72) Inventors: Ryoma Yoshioka, Ibaraki (JP); Yusuke Shimizu, Ibaraki (JP); Naoki Shibata, Ibaraki (JP); Naoto Konegawa, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 15/757,482

(22) PCT Filed: Sep. 8, 2016

(86) PCT No.: PCT/JP2016/076439
§ 371 (c)(1),
(2) Date: Mar. 5, 2018

(87) PCT Pub. No.: WO2017/043570
PCT Pub. Date: Mar. 16, 2017

(65) Prior Publication Data
US 2018/0259709 A1    Sep. 13, 2018

(30) Foreign Application Priority Data

Sep. 9, 2015  (JP) .................................. 2015-177462
Sep. 6, 2016  (JP) .................................. 2016-173429

(51) Int. Cl.
*G02B 6/125*    (2006.01)
*G02B 6/12*     (2006.01)
*G06F 3/042*    (2006.01)

(52) U.S. Cl.
CPC .......... *G02B 6/125* (2013.01); *G02B 6/12004* (2013.01); *G06F 3/042* (2013.01); *G02B 2006/1214* (2013.01)

(58) Field of Classification Search
CPC ....... G06F 3/042; G02B 6/125; G02B 6/1214; G02B 6/12004
See application file for complete search history.

(56) References Cited

U.S. PATENT DOCUMENTS 5,475,771 A * 12/1995 Hosoi ................... G02B 6/126
                                                          385/11
6,201,913 B1 * 3/2001 Yi ......................... G02B 6/125
                                                          385/22

(Continued)

FOREIGN PATENT DOCUMENTS

JP          10-50968 A      2/1998
JP       2001-194545 A      7/2001

(Continued)

OTHER PUBLICATIONS

International Search Report dated Nov. 29, 2016, issued in Counterpart of International Application No. PCT/JP2016/076439 (2 pages).

(Continued)

*Primary Examiner* — Akm E Ullah
(74) *Attorney, Agent, or Firm* — Westerman, Hattori, Daniels & Adrian, LLP

(57) ABSTRACT

Provided are an optical waveguide capable of propagating light, and a position sensor and an optical circuit board including the same. The optical waveguide includes cores each partially formed in an S-shape. The S-shaped portion includes a first curved portion upstream as seen in the direction of light propagation, and a second curved portion downstream as seen in the direction of light propagation and curved in a direction opposite to the first curved portion. The (Continued)

first curved portion and the second curved portion are connected to each other via a straight portion having a length in the range of from 0 mm to 30 mm. One of the width of the exit of the first curved portion and the width of the entrance of the second curved portion is smaller than the width of a core portion upstream of the S-shaped portion.

12 Claims, 13 Drawing Sheets

(56) References Cited

U.S. PATENT DOCUMENTS

| | | | | |
|---|---|---|---|---|
| 7,210,215 B2* | 5/2007 | Kato | ................ | H02K 15/0037 29/596 |
| 7,450,803 B2* | 11/2008 | Miyadera | ............... | G02B 6/125 385/129 |
| 2003/0156813 A1* | 8/2003 | Terakawa | ............... | G02B 6/125 385/129 |
| 2013/0170802 A1* | 7/2013 | Pitwon | ................ | G02B 6/125 385/124 |
| 2015/0378517 A1 | 12/2015 | Shimizu et al. | | |

FOREIGN PATENT DOCUMENTS

| | | |
|---|---|---|
| JP | 2003-240991 A | 8/2003 |
| JP | 2005-266657 A | 9/2005 |
| JP | 2013-109492 A | 6/2013 |
| JP | 2014-29466 A | 2/2014 |
| JP | 2014-197363 A | 10/2014 |

OTHER PUBLICATIONS

Notification of Transmittal of Translation of the International Preliminary Report on Patentability (Form PCT/IB/338) issued in counterpart International Application No. PCT/JP2016/076439 dated Mar. 22, 2018, with Forms PCT/IB/373 and PCT/ISA/237. (8 pages).

* cited by examiner

RELATED ART

RELATED ART

OPTICAL WAVEGUIDE HAVING CORE PARTIALLY FORMED IN S-SHAPE, AND POSITION SENSOR AND OPTICAL CIRCUIT BOARD INCLUDING THE SAME

TECHNICAL FIELD

The present invention relates to an optical waveguide, a position sensor which optically senses a pressed position with the use of the optical waveguide, and an optical circuit board which propagates light to and from an optical element or the like with the use of the optical waveguide.

BACKGROUND ART

The present applicant has heretofore proposed a position sensor which optically senses a pressed position with the use of an optical waveguide (see PTL 1, for example). As shown in FIG. 17A, this position sensor includes a rectangular sheet-like optical waveguide W10 configured such that a sheet-like core pattern member is held between a rectangular sheet-like under cladding layer 11 and a rectangular sheet-like over cladding layer 13. The aforementioned core pattern member includes: a lattice-shaped portion 12A including a plurality of linear cores 12 serving as an optical path and arranged vertically and horizontally; a first outer peripheral core portion 12B disposed along a first horizontal side and a first vertical side of the outer periphery of the lattice-shaped portion 12A; and a second outer peripheral core portion 12C disposed along a second horizontal side and a second vertical side which are opposed to the first horizontal side and the first vertical side, with the lattice-shaped portion 12A therebetween. The first outer peripheral core portion 12B includes a single core 26. The vertical and horizontal cores 12 of the lattice-shaped portion 12A have respective front ends branching off from the single core 26. The second outer peripheral core portion 12C includes cores 27 extending from the rear ends of the respective cores 12 of the lattice-shaped portion 12A. In the position sensor, a light-emitting element 14 is connected to an end surface of the first outer peripheral core portion 12B of the core pattern member, and a light-receiving element 15 is connected to an end surface of the second outer peripheral core portion 12C thereof.

In the position sensor including such an optical waveguide, light emitted from the light-emitting element 14 branches from the core 26 of the first outer peripheral core portion 12B into the cores 12 of the lattice-shaped portion 12A, passes through the cores 27 of the second outer peripheral core portion 12C, and is received by the light-receiving element 15. A surface portion (a rectangular portion indicated by dash-and-dot lines in the center of FIG. 17A) of the over cladding layer 13 corresponding to the lattice-shaped portion 12A serves as an input region 13A for the position sensor.

Input to the position sensor is performed by pressing the input region 13A, for example, with a pen tip for input. This deforms at least one of the cores 12 which corresponds to the pressed part to decrease the amount of light propagating in the at least one core 12. The intensity of light received by the light-receiving element 15 is accordingly decreased in the at least one core 12 corresponding to the pressed part. In this manner, the position sensor senses the pressed position. The position sensor is also capable of sensing the input of a character and the like through the use of the position sensing.

With the increase in the amount of transmission information, an optical circuit board in addition to an electrical circuit board has been employed in recent electronic devices and the like. An example of such electronic devices is shown in FIG. 18. In this electronic device, the aforementioned optical circuit board is stacked on the electrical circuit board. Specifically, the electrical circuit board 80 includes an insulative layer 81, and an electrical interconnect line 82 formed on the front surface of the insulative layer 81. The optical circuit board 70 includes an optical waveguide W20 (a first cladding layer 71, a core (optical path) 72, and a second cladding layer 73) stacked on the back surface (the surface opposite from the surface with the electrical interconnect line 82 formed thereon) of the insulative layer 81, and optical elements (a light-emitting element 74 and a light-receiving element 75) mounted on portions of the front surface (the surface with the electrical interconnect line 82 formed thereon) of the insulative layer 81 which correspond to opposite end portions of the optical waveguide W20 (see PTL 2, for example). In this optical circuit board 70, the opposite end portions of the optical waveguide W20 are formed into inclined surfaces inclined at 45 degrees with respect to the axial direction of the core 72. Portions of the core 72 positioned at the inclined surfaces function as light reflecting surfaces 72a and 72b. Portions of the insulative layer 81 corresponding to the light-emitting element 74 and the light-receiving element 75 have respective through holes 81a and 81b formed therein. The through holes 81a and 81b allow light L (indicated by dash-double-dot lines) to propagate (allow optical connection) therethrough between the light-emitting element 74 and the light reflecting surface 72a provided in a first end portion and between the light-receiving element 75 and the light reflecting surface 72b provided in a second end portion.

The propagation of light in the aforementioned optical circuit board 70 is performed in a manner to be described below. First, the light L emitted from the light-emitting element 74 passes through the through hole 81a of the insulative layer 81, and then passes through a first end portion (the right-hand end portion as seen in FIG. 18) of the first cladding layer 71. Then, the light L is reflected from the light reflecting surface 72a in a first end portion of the core 72 (or the optical path is changed by 90 degrees), and is propagated in the core 72. Then, the light L propagated in the core 72 is reflected from the light reflecting surface 72b in a second end portion (the left-hand end portion as seen in FIG. 18) of the core 72 (or the optical path is changed by 90 degrees), and passes through a second end portion of the first cladding layer 71 outwardly. Then, the light L passes through the through hole 81b of the insulative layer 81, and is thereafter received by the light-receiving element 75.

In some cases, an optical fiber is used in place of the light-receiving element 75 in a second end portion of the optical circuit board 70. In this case, the propagation of light is performed in the same manner as described above.

RELATED ART DOCUMENT

Patent Document

PTL 1: JP-A-2014-197363
PTL 2: JP-A-2014-29466

SUMMARY OF INVENTION

Unfortunately, there have been cases in which the position sensor (with reference to FIG. 17A) fails to precisely sense the pressed position depending on the circumstances. As a result of the investigation into the cause of the failure, the present inventors have found that, when the pressed position cannot be precisely sensed, a portion having a low intensity of light received by the light-receiving element 15 exists while the input region 13A is not pressed.

When a character or the like is inputted in the case where the portion having a low intensity of light received by the light-receiving element 15 exists without pressing the input region 13A, a portion pressed by the input also has a low intensity of light received by the light-receiving element 15. Thus, the pressed position cannot be precisely sensed. The position sensor including the aforementioned optical waveguide still has room for improvement in these regards.

There have also been cases in which the optical circuit board 70 (with reference to FIG. 18) has a low intensity of light received by the light-receiving element 15 depending on the circumstances. When an optical fiber is used in place of the light-receiving element 75, there have been cases in which the amount of light propagating to the optical fiber is decreased. In such cases, an electronic device or the like incorporating the optical circuit board 70 does not properly operate because of the failure to properly propagate light (transmit information).

In view of the foregoing, it is therefore an object of the present invention to provide an optical waveguide capable of propagating light properly, and a position sensor and an optical circuit board including the same.

To accomplish the aforementioned object, a first aspect of the present invention is intended for an optical waveguide comprising: a linear core serving as an optical path; and upper and lower cladding layers holding the core therebetween, wherein the core is partially formed in an S-shape, wherein the S-shaped portion includes a first curved portion upstream as seen in the direction of light propagation, and a second curved portion downstream as seen in the direction of light propagation and curved in a direction opposite to the first curved portion, wherein the first curved portion and the second curved portion are connected to each other via a straight portion having a length in the range of from 0 mm to 30 mm, and wherein one of the width of the exit of the first curved portion and the width of the entrance of the second curved portion is smaller than the width of a core portion upstream of the S-shaped portion.

A second aspect of the present invention is intended for a position sensor comprising: a sheet-like optical waveguide including a sheet-like core pattern member, and upper and lower sheet-like cladding layers holding the core pattern member therebetween, the sheet-like core pattern member including a lattice-shaped portion having a plurality of linear cores, a first outer peripheral core portion positioned on a first horizontal side and a first vertical side of an outer periphery of the lattice-shaped portion and optically connected to front ends of respective vertical cores of the lattice-shaped portion and to front ends of respective horizontal cores of the lattice-shaped portion, and a second outer peripheral core portion positioned on and extending along a second horizontal side and a second vertical side which are opposed respectively to the first horizontal side and the first vertical side, with the lattice-shaped portion therebetween, and extending from rear ends of the respective vertical cores of the lattice-shaped portion and from rear ends of the respective horizontal cores of the lattice-shaped portion; a light-emitting element connected to an end surface of the first outer peripheral core portion of the optical waveguide; and a light-receiving element connected to an end surface of the second outer peripheral core portion, wherein part of the optical waveguide corresponding to at least a portion of the second outer peripheral core portion is an optical waveguide as recited in the first aspect, wherein light emitted from the light-emitting element passes through the first outer peripheral core portion, the lattice-shaped portion and the second outer peripheral core portion, and is received by the light-receiving element, wherein a surface portion of the position sensor corresponding to the lattice-shaped portion of the core pattern member serves as an input region, and wherein a pressed position in the input region is determined based on the amount of light propagating in the cores which is varied by the pressing.

A third aspect of the present invention is intended for an optical circuit board comprising: an optical waveguide as recited in the first aspect; and an optical member optically connected to an end portion of the core of the optical waveguide.

The term "S-shape" as used in the present invention refers to a portion in which the first curved portion and the second curved portion are connected to each other via the straight portion having a length in the range of from 0 (zero) mm to 30 mm as described above, and shall be meant to include an inverted S-shape. The expression "the straight portion has a length of 0 (zero) mm" shall mean that the first curved portion and the second curved portion are directly connected to each other without the straight portion. The first curved portion and the second curved portion shall be meant to include those that are curved even slightly.

In the optical circuit board according to the third aspect of the present invention, the optical member is a member responsible for emitting light, receiving light, propagating light or the like. Examples of the optical member include optical elements (a light-emitting element and a light-receiving element) for opto-electric conversion, optical fibers responsible for propagating light, and optical fiber connecting connectors for use in connection of the optical fibers.

To equalize the intensity of light received by the light-receiving element while the input region is not pressed, the present inventors have made investigation into the cause of the occurrence of a location where the intensity of light received by the light-receiving element 15 is low without pressing the input region 13A in the related art technique shown in FIG. 17A. As a result, it has turned out that light leakage occurs in an S-shaped core portion in the second outer peripheral core portion 12C between the lattice-shaped portion 12A and the light-receiving element 15, which in turn is the cause. The light-receiving element 15 connected to an end surface of the second outer peripheral core portion 12C is disposed in the periphery of the sheet-like optical waveguide W10. Depending on the position of the light-receiving element 15, at least some of the cores 27 of the second outer peripheral core portion 12C are partially formed in the S-shape near the light-receiving element 15 (in a region surrounded by an ellipse D0 of FIG. 17A) in some cases.

Then, the present inventors have made investigation into the cause of the light leakage in the S-shaped portion of the cores 27. In the course of the investigation, it has turned out that light L leans toward the outside portion of the curve of an upstream first curved portion S11 in the aforementioned S-shaped portion (with reference to FIG. 17B). In the position sensor, the greater width of the cores 12, 26 and 27 allows the greater amount of light propagating in the cores 12, 26 and 27 and the greater amount of decrease in the propagating light due to the pressing of the input region 13A. This facilitates the sensing of the pressed position. For this reason, the cores 12, 26 and 27 having a greater width are formed in the position sensor of the related art. As shown in FIG. 17B, when the core 27 has a greater width in the S-shaped portion, the light L (indicated by dash-double-dot lines) leaning toward the outside portion of the curve of the upstream first curved portion S11 as mentioned above is propagated to a downstream second curved portion S12 while leaning toward the inside of the curve near the entrance of the downstream second curved portion S12, and reaches the outside side surface of the curve of the second curved portion S12 in a concentrated manner. It has turned out that, when the core 27 has a greater width as described above, most of the light L reaching the aforementioned side surface is transmitted through the side surface (leaks from the core 27) without reflecting from the side surface because the incident angle θ of the light L is smaller than the critical angle. That is, it has turned out that the cause of the leakage of the light L in the S-shaped portion lies in the greater width of the core 27 in the S-shaped portion.

Also, it has turned out that the optical circuit board has a problem similar to that of the aforementioned position sensor. That is, when the intensity of light received by the light-receiving element is low in the optical circuit board of the related art, the cores are partially formed in the aforementioned S-shape, and light leakage occurs in the S-shaped portion. In the optical circuit board of the related art, the cores are formed to have a greater width because the greater width of the cores allows the greater amount of light propagating in the cores (the greater amount of transmitted information). It has turned out that the light L leaks in the S-shaped portion due to this fact (with reference to FIG. 17B).

It has also turned out that light leaks in the second curved portion in the same manner as described above when the first curved portion and the second curved portion are connected to each other via the straight portion having a length of not greater than 30 mm. On the other hand, it has turned out that light leaks little in the second curved portion when the straight portion has a length of greater than 30 mm. In this case, the light leaning toward the outside portion of the curve of the first curved portion is repeatedly reflected from the side surface of the straight portion because of the sufficient length of the straight portion, and the leaning of the light is eliminated near the exit of the straight portion. Thus, the light leans little toward the inside of the curve near the entrance of the second curved portion, and is little concentrated on the outside side surface of the curve of the second curved portion when reaching the side surface. The light leaks accordingly little in the second curved portion.

In view of these findings, the present inventors have hit upon the idea of making the core width of the downstream second curved portion smaller in the S-shaped portion, and have made one of the width of the exit of the first curved portion and the width of the entrance of the second curved portion smaller than the width of a core portion upstream of the S-shaped portion. As a result, the present inventors have found out that most of the light reaching the outside side surface of the curve of the second curved portion is reflected from the side surface because the incident angle of the light is greater than the critical angle in the second curved portion, so that the leakage of light is reduced. That is, the present inventors have found out that, even if the cores in the second outer peripheral core portion between the lattice-shaped portion and the light-receiving element are partially formed in the S-shape in the position sensor, the propagating light reaches the light-receiving element, with leakage of the propagating light reduced in the cores in the second outer peripheral core portion, by setting the aforementioned specific widths of the S-shaped portion. The present inventors have found that the intensity of light received by the light-receiving element is thus equalized while the input region is not pressed, and have attained the present invention.

The problem of the leakage of light from the S-shaped portion of the cores in the optical circuit board is also solved in the same manner as in the position sensor. That is, the present inventors have found out that, even if the cores are partially formed in the S-shape in the optical circuit board, the leakage of the propagating light is reduced in the S-shaped portion by setting the aforementioned specific widths of the S-shaped portion. The present inventors have found that the decrease in the intensity of light received by the light-receiving element or the decrease in the amount of light propagating to an optical fiber is thus suppressed, and have attained the present invention.

The present inventors have found that not only the optical waveguide for use in the aforementioned position sensor and the aforementioned optical circuit board but also an optical waveguide used for other applications, e.g. for opto-electric hybrid boards, achieves light propagation more properly when the cores are partially formed in the aforementioned S-shape.

The expression "the intensity of light received by the light-receiving element is equal" in the aforementioned position sensor shall be meant to include not only being absolutely equal but also being roughly equal to such an extent that the pressed position in the input region of the position sensor can be sensed if precisely sensed.

In the optical waveguide according to the present invention, the core is partially formed in an S-shape. In the S-shaped portion, one of the width of the exit of the upstream first curved portion and the width of the entrance of the downstream second curved portion is smaller than the width of a core portion upstream of the S-shaped portion. Thus, when the light propagating in the first curved portion reaches the outside side surface of the curve of the second curved portion, the incident angle of the light is greater than the critical angle. Most of the light is reflected from the side surface, so that the leakage of the light is reduced. In other words, the optical waveguide according to the present invention is capable of propagating the light in the core more properly.

In the position sensor according to the present invention, part of the optical waveguide corresponding to at least a portion of the second outer peripheral core portion between the lattice-shaped portion and the light-receiving element is the aforementioned optical waveguide of the present invention. Thus, when light propagating in the first curved portion in each core in the part of the optical waveguide reaches the outside side surface of the curve of the second curved portion, the incident angle of the light is greater than the critical angle. Most of the light is reflected from the side surface, so that the leakage of the light is reduced. That is, light propagating in the cores in the second outer peripheral core portion reaches the light-receiving element, with the leakage of the propagating light reduced. Thus, the intensity of light received by the light-receiving element is equalized while the input region is not pressed. Thus, the location where the intensity of light received by the light-receiving element is decreased is made clear when the input region is pressed. As a result, the position sensor according to the present invention is capable of precisely sensing the pressed position in the input region.

In the optical circuit board according to the present invention, an optical waveguide for optical connection to an optical member is the aforementioned optical waveguide according to the present invention. Thus, when light propagating in the first curved portion in the S-shaped portion of each core in the optical waveguide reaches the outside side surface of the curve of the second curved portion, the incident angle of the light is greater than the critical angle. Most of the light is reflected from the side surface, so that the leakage of the light is reduced. That is, when the optical member receives light from end portions of the cores of the optical waveguide, the leakage of the propagating light is reduced in the cores of the optical waveguide. This suppresses the decrease in the intensity of light received by the optical member. The formation of the S-shaped portion in each of the cores improves flexibility in layout design of the cores to allow the layout design of the cores in accordance with the layout of the optical member. Also, the proper operation of electronic devices and the like incorporating the optical circuit board according to the present invention is achieved with reliability.

In particular, in the case where the width of the entrance of the second curved portion is smaller than the width of the core portion upstream of the S-shaped portion, and where a relationship between the width (B1; in μm) of the entrance of the second curved portion, the radius of curvature (R2; in mm) of the second curved portion, the refractive index (K1) of the core with the S-shaped portion formed therein, and the refractive index (K2) of one of the cladding layers which covers the side surface of the core satisfies Formula (1) below, the amount of leakage of propagating light is further reduced in the second curved portion in the optical waveguide according to the present invention. This equalizes the intensity of light received by the light-receiving element to improve the precision of the sensing of the pressed position in the position sensor according to the present invention. It should be noted that the radius of curvature (R2) of the second curved portion is the radius of curvature of a widthwise center line of the second curved portion.

[MATH. 1]

$$B2/R2 \leq 800 \times (K1-K2) \quad (1)$$

Further, in the case where the relationship between the width (B1; in μm) of the entrance of the second curved portion, the radius of curvature (R2; in mm) of the second curved portion, the refractive index (K1) of the core with the S-shaped portion formed therein, and the refractive index (K2) of one of the cladding layers which covers the side surface of the core satisfies Formula (2) below, the amount of leakage of propagating light is further reduced in the second curved portion in the optical waveguide according to the present invention. This further equalizes the intensity of light received by the light-receiving element to further improve the precision of the sensing of the pressed position in the position sensor according to the present invention.

[MATH. 2]

$$B2/R2 \leq 800 \times (K1-K2) - 4 \quad (2)$$

Also, in the case where the width of the entrance of the second curved portion is smaller than the width of the core portion upstream of the S-shaped portion, where the width of the first curved portion decreases gradually from the entrance of the first curved portion toward the exit thereof, where the width of the straight portion and the width of the second curved portion are constant in the longitudinal direction thereof, and where the width of the exit of the first curved portion, the width of the straight portion, and the width of the second curved portion are equal to each other, the amount of leakage of propagating light is also reduced in the second curved portion, so that the light is propagated in the core more properly. In the position sensor according to the present invention, the intensity of light received by the light-receiving element is equalized, whereby the pressed position is sensed precisely.

Also, in the case where the width of the entrance of the second curved portion is smaller than the width of the core portion upstream of the S-shaped portion, where the width of the first curved portion, the width of the straight portion, and the width of the second curved portion are constant in the longitudinal direction thereof, where the width of the first curved portion is greater than the width of the second curved portion, where the width of the straight portion and the width of the second curved portion are equal to each other, and where the entrance of the straight portion is disposed in part of the exit of the first curved portion which corresponds to the outside of the curve of the first curved portion as seen in the width direction, the amount of leakage of propagating light is also reduced in the second curved portion, so that the light is propagated in the core more properly. In the position sensor according to the present invention, the intensity of light received by the light-receiving element is equalized, whereby the pressed position is sensed precisely.

Also, in the case where the width of the entrance of the second curved portion is smaller than the width of the core portion upstream of the S-shaped portion, where the width of the first curved portion, the width of the straight portion, and the width of the second curved portion are constant in the longitudinal direction thereof, where the width of the first curved portion is greater than the width of the second curved portion, where the width of the first curved portion and the width of the straight portion are equal to each other, and where the entrance of the second curved portion is disposed in part of the exit of the straight portion which corresponds to the outside of the curve of the first curved portion as seen in the width direction, the amount of leakage of propagating light is also reduced in the second curved portion, so that the light is propagated in the core more properly. In the position sensor according to the present invention, the intensity of light received by the light-receiving element is equalized, whereby the pressed position is sensed precisely.

Also, in the case where the width of the entrance of the second curved portion is smaller than the width of the core portion upstream of the S-shaped portion, where the width of the first curved portion and the width of the second curved portion are constant in the longitudinal direction thereof, where the width of the first curved portion is greater than the width of the second curved portion, where the width of the entrance of the straight portion is equal to the width of the first curved portion, and where the width of the exit of the straight portion is equal to the width of the second curved portion, the amount of leakage of propagating light is also reduced in the second curved portion, so that the light is propagated in the core more properly. In the position sensor according to the present invention, the intensity of light received by the light-receiving element is equalized, whereby the pressed position is sensed precisely.

Also, in the case where the width of the entrance of the second curved portion is smaller than the width of the core portion upstream of the S-shaped portion, and where all of the width of the first curved portion, the width of the straight portion, and the width of the second curved portion are constant and equal in the longitudinal direction thereof, the amount of leakage of propagating light is also reduced in the second curved portion, so that the light is propagated in the core more properly. In the position sensor according to the present invention, the intensity of light received by the light-receiving element is equalized, whereby the pressed position is sensed precisely.

On the other hand, in the case where the width of the exit of the first curved portion is smaller than the width of the core portion upstream of the S-shaped portion, and where a relationship between the width (B1; in μm) of the exit of the first curved portion, the radius of curvature (R1; in mm) of the first curved portion, the refractive index (K1) of the core with the S-shaped portion formed therein, and the refractive index (K2) of one of the cladding layers which covers the side surface of the core satisfies Formula (3) below, the amount of leakage of propagating light is further reduced in the second curved portion in the optical waveguide according to the present invention. Thus, when the optical member receives light from end portions of the cores of the optical waveguide in the optical circuit board according to the present invention, the decrease in the intensity of light received by the optical member is further suppressed. The reliability of the achievement of the proper operation of electronic devices and the like incorporating the optical circuit board is improved. It should be noted that the radius of curvature (R1) of the first curved portion S1 is the radius of curvature of a widthwise center line of the first curved portion S1.

[MATH. 3]

$$B1/R1 \leq 800 \times (K1-K2) \quad (3)$$

Also, in the case where the width of the exit of the first curved portion is smaller than the width of the core portion upstream of the S-shaped portion, where the width of the first curved portion decreases gradually from the entrance of the first curved portion toward the exit thereof, where the width of the straight portion and the width of the second curved portion are constant in the longitudinal direction thereof, and where the width of the exit of the first curved portion, the width of the straight portion, and the width of the second curved portion are equal to each other, the amount of leakage of propagating light is also reduced in the second curved portion, so that the light is propagated in the core more properly. Thus, the decrease in the intensity of light received by the optical member is suppressed in the optical circuit board according to the present invention. Also, the proper operation of electronic devices and the like incorporating the optical circuit board is achieved with reliability.

DESCRIPTION OF EMBODIMENTS

Next, embodiments according to the present disclosure will now be described in detail with reference to the drawings.

Figure 1A:
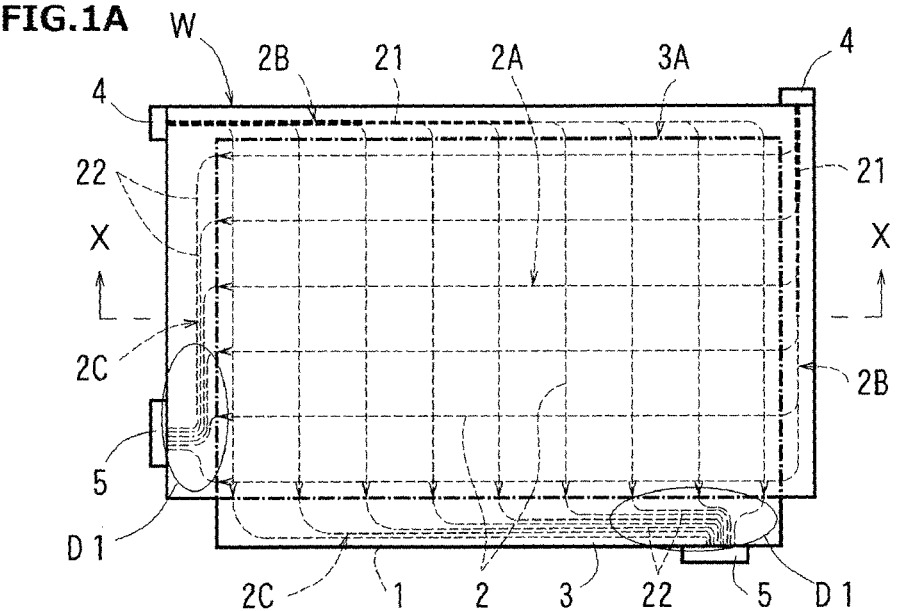
FIG. 1A is a schematic plan view of a first embodiment of a position sensor according to the present invention.
Figure 1B:
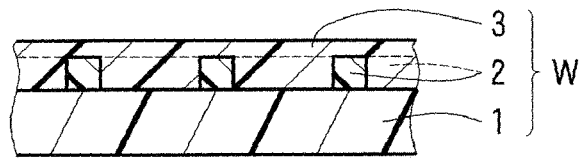
FIG. 1B is a schematic enlarged sectional view of a midsection taken along the line X-X of FIG. 1A.

FIG. 1A is a plan view of a first embodiment of a position sensor according to the present disclosure. FIG. 1B is an enlarged view of a midsection taken along the line X-X of FIG. 1A. The position sensor according to this embodiment includes: a rectangular sheet-like optical waveguide W; two light-emitting elements 4 disposed in two adjacent corner portions (two upper corner portions as seen in FIG. 1A) of the rectangular shape of the optical waveguide W; and two light-receiving elements 5 disposed in the remaining two corner portions (two lower corner portions as seen in FIG. 1A) thereof.

The optical waveguide W includes: a rectangular sheet-like under cladding layer 1; a sheet-like core pattern member formed on a surface of the under cladding layer 1; and a rectangular sheet-like over cladding layer 3 formed on the surface of the under cladding layer 1 while covering the core pattern member. The core pattern member includes: a lattice-shaped portion 2A including a plurality of linear cores 2 serving as an optical path and arranged vertically and horizontally; a first outer peripheral core portion 2B positioned on and extending along a first horizontal side and a first vertical side (upper and right-hand sides as seen in FIG. 1A) of the outer periphery of the lattice-shaped portion 2A; and a second outer peripheral core portion 2C positioned on and extending along a second horizontal side and a second vertical side (lower and left-hand sides as seen in FIG. 1A) which are opposed respectively to the first horizontal side and the first vertical side, with the lattice-shaped portion 2A therebetween.

The first outer peripheral core portion 2B includes a single core 21, and is optically connected to front ends (upper ends as seen in FIG. 1A) of respective vertical cores 2 of the lattice-shaped portion 2A and to front ends (right-hand ends as seen in FIG. 1A) of respective horizontal cores 2 of the lattice-shaped portion 2A. Thus, the vertical cores 2 and the horizontal cores 2 branch off from the first outer peripheral core portion 2B. The second outer peripheral core portion 2C includes cores 22 extending from rear ends (lower ends as seen in FIG. 1A) of the respective vertical cores 2 and from rear ends (left-hand ends as seen in FIG. 1A) of the respective horizontal cores 2. The light-emitting elements 4 are connected to end surfaces of the first outer peripheral core portion 2B, and the light-receiving elements 5 are connected to end surfaces of the second outer peripheral core portion 2C.

In FIG. 1A, the cores 2, 21 and 22 are indicated by chain-dotted lines. Also, in FIG. 1A, the number of cores 2 in the lattice-shaped portion 2A and the number of cores 22 in the second outer peripheral core portion 2C which extend from the cores 2 are shown as abbreviated. Arrows of the cores 2 in FIG. 1A indicate the directions in which light travels.

Figure 1C:
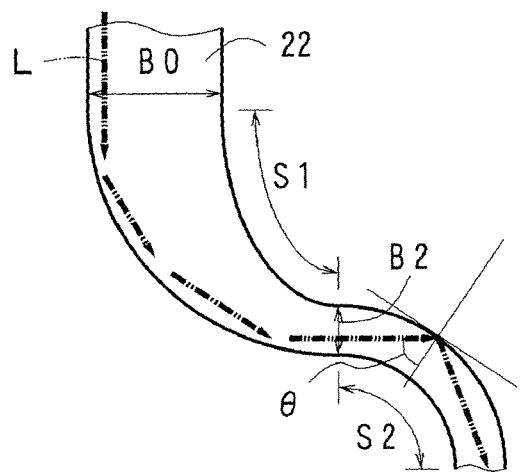
FIG. 1C is a schematic enlarged plan view of an S-shaped portion of a core formed in regions surrounded by ellipses D1 of FIG. 1A.

A feature of the position sensor according to this embodiment is the core widths of an S-shaped portion of certain ones of the cores 22 of the second outer peripheral core portion 2C which is formed near the light-receiving elements 5 (in regions surrounded by ellipses D1 of FIG. 1A), as shown in enlarged plan view of FIG. 1C. FIG. 1C shows the S-shaped portion of one of the cores 22 of the second outer peripheral core portion 2C in enlarged plan view. The S-shaped portion in this embodiment includes a first curved portion S1 upstream as seen in the direction of light propagation, and a second curved portion S2 downstream as seen in the direction of light propagation and curved in a direction opposite to the first curved portion S1. The first curved portion S1 and the second curved portion S2 are connected in contiguous relation. The width of the entrance (the entrance of the first curved portion S1) of the S-shaped portion is equal to the width B0 of a core portion upstream of the S-shaped portion. In the S-shaped portion, the width of the first curved portion S1 decreases gradually from the entrance of the first curved portion S1 toward the exit thereof. The width of the exit of the first curved portion S1 is equal to the width B2 of the entrance of the second curved portion S2. The second curved portion S2 has a width constant in the longitudinal direction thereof. Thus, the width B2 of the entrance of the second curved portion S2 is smaller than the width B0 of the core portion upstream of the S-shaped portion.

In this manner, setting the characteristic core widths of the S-shaped portion reduces leakage of light L in the S-shaped portion (reduces the propagation loss of the light L). When the light L (indicated by dash-double-dot lines) leans toward an outside portion of the curve of the upstream first curved portion S1 and is propagated to the downstream second curved portion S2 in the S-shaped portion, the light L is propagated near the entrance of the second curved portion S2 while leaning toward the inside of the curve, and reaches the outside side surface of the curve of the second curved portion S2 in a concentrated manner. The incident angle θ of the light L reaching the side surface is greater than the critical angle because the core width of the second curved portion S2 is smaller in accordance with the setting of the characteristic core widths of the S-shaped portion as mentioned above. For this reason, most of the light L is reflected from the aforementioned side surface, so that the leakage of the light L is reduced. The light L reaches the light-receiving elements 5 while leakage of the propagating light L is reduced in the cores 22 of the second outer peripheral core portion 2C.

In such a position sensor, light emitted from the light-emitting elements 4 branches from the core 21 of the first outer peripheral core portion 2B into the cores 2 of the lattice-shaped portion 2A, passes through the cores 22 of the second outer peripheral core portion 2C, and is received by the light-receiving elements 5, as shown in FIG. 1A. A surface portion (a rectangular portion indicated by dash-and-dot lines in the center of FIG. 1A) of the over cladding layer 3 corresponding to the lattice-shaped portion 2A of the core pattern member serves as an input region 3A.

The input of a character or the like to the position sensor is performed by writing the character or the like into the input region 3A with an input element such as a pen either directly or through a resin film, paper or the like. At this time, the input region 3A is pressed with the tip of the pen or the like, so that at least one of the cores 2 corresponding to the pressed part is deformed. The deformation decreases the amount of light propagating in the at least one core 2. Thus, the intensity of light received by the light-receiving elements 5 is decreased in the at least one core 2 corresponding to the pressed part. In this manner, the position sensor senses the pressed position (X and Y coordinates).

As mentioned above, light propagating in the cores 22 of the second outer peripheral core portion 2C reaches the light-receiving elements 5 while leakage of the propagating light is reduced. This equalizes the intensity of light received by the light-receiving elements 5 while the input region 3A is not pressed. Thus, the location where the intensity of light received by the light-receiving elements 5 is decreased is made clear when the input region 3A is pressed. As a result, the position sensor is capable of precisely sensing the pressed position in the input region 3A.

From the viewpoints of further reducing the amount of leakage of propagating light in the second curved portion S2 and thereby further equalizing the intensity of light received by the light-receiving elements 5 to improve the precision of the sensing of the pressed position, it is preferable that a relationship between the width (B2; in μm) of the entrance of the second curved portion S2, the radius of curvature (R2; in mm) of the second curved portion S2, the refractive index (K1) of the cores 22 with the S-shaped portion formed therein, and the refractive index (K2) of the over cladding layer 3 covering the side surfaces of the cores 22 is established so as to satisfy Formula (1) below. More preferably, the relationship is established so as to satisfy Formula (2) below. It should be noted that the radius of curvature (R2) of the second curved portion S2 is the radius of curvature of a widthwise center line of the second curved portion S2.

[MATH. 4]

$$B2/R2 \leq 800 \times (K1 - K2) \qquad (1)$$

[MATH. 5]

$$B2/R2 \leq 800 \times (K1-K2) - 4 \quad (2)$$

The light-receiving elements 5, which are in general small, have a narrow light-receiving region for connection to the cores 22. Accordingly, there is a limit to the number of cores 22 for connection to the narrow light-receiving region. In the position sensor, the core width of the downstream second curved portion S2 is smaller in the S-shaped portion formed near the light-receiving elements 5, as mentioned above. The formation of the cores 22 having the smaller width to the front ends thereof allows the increase in the number of cores 22 for connection to the light-receiving region. As a result, this allows the increase in the number of cores 2 of the lattice-shaped portion 2A corresponding to the input region 3A to achieve an improvement in positional accuracy of the pressed position sensed in the input region 3A.

In the optical waveguide W, it is preferable that the cores 2 of the lattice-shaped portion 2A have an elasticity modulus higher than the elasticity moduli of the under cladding layer 1 and the over cladding layer 3. The reason for this is as follows. If the elasticity modulus of the cores 2 is lower than the elasticity moduli of the under cladding layer 1 and the over cladding layer 3, the surroundings of the cores 2 are hard, so that part of the optical waveguide W having an area significantly greater than the area of the pen tip or the like which presses part of the input region 3A of the over cladding layer 3 is depressed. As a result, it tends to be difficult to precisely sense the pressed position. For this reason, it is preferable that the elasticity moduli are as follows: the cores 2 have an elasticity modulus in the range of 1 GPa to 10 GPa; the over cladding layer 3 has an elasticity modulus in the range of 0.1 GPa to less than 10 GPa; and the under cladding layer 1 has an elasticity modulus in the range of 0.1 MPa to 1 GPa, for example. In this case, the cores 2 are not crushed (the cross-sectional area of the cores 2 is not decreased) with a small pressing force because of the high elasticity modulus of the cores 2. However, the optical waveguide W is depressed by the pressing, so that light leakage (scattering) occurs from the bent part of the cores 2 corresponding to the depressed part. Thus, the intensity of light received by the light-receiving elements 5 is decreased in these cores 2. In this manner, the pressed position is sensed. The aforementioned values of the elasticity moduli are values of tensile elasticity moduli measured using a dynamic mechanical analyzer RSA III available from TA Instruments Japan Inc.

Examples of materials for the formation of the under cladding layer 1, the cores 2, 21 and 22, and the over cladding layer 3 include photosensitive resins and thermosetting resins. The optical waveguide W may be produced by a manufacturing method depending on the materials. The cores 2, 21 and 22 have a refractive index higher than the refractive indices of the under cladding layer 1 and the over cladding layer 3. The adjustment of the refractive indices and the elasticity moduli may be made, for example, by adjusting the selection of the types of the materials for the formation of the cores 2, 21 and 22, the under cladding layer 1 and the over cladding layer 3, and the composition ratio thereof. Examples of the thicknesses of the respective layers are as follows: the under cladding layer 1 has a thickness in the range of 10 to 500 µm; the cores 2, 21 and 22 have a thickness in the range of 5 to 100 µm; and the over cladding layer 3 has a thickness (a thickness as measured from the top surfaces of the cores 2, 21 and 22) in the range of 1 to 200 µm. A rubber sheet may be used as the under cladding layer 1, and the cores 2, 21 and 22 may be formed on the rubber sheet.

Figure 2:
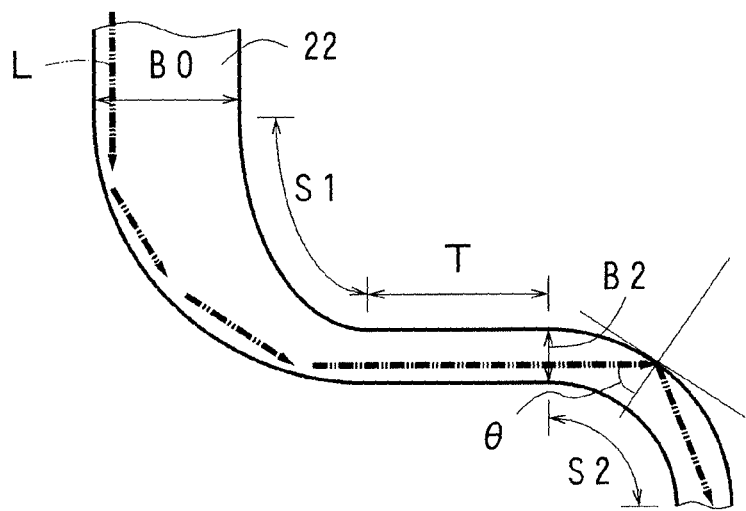
FIG. 2 is a schematic enlarged plan view of the S-shaped portion in a second embodiment of the position sensor of the present invention.

FIG. 2 is an enlarged plan view (a view corresponding to FIG. 1C) of the S-shaped portion in a second embodiment of the position sensor of the present disclosure. In the second embodiment, the S-shaped portion is formed in such a manner that the first curved portion S1 and the second curved portion S2 in the first embodiment shown in FIGS. 1A to 1C are connected to each other via a straight portion T having a length in the range of greater than 0 (zero) mm to 30 mm. The straight portion T has a width constant in the longitudinal direction thereof and equal to the width of the exit of the first curved portion S1 (the width B2 of the entrance of the second curved portion S2). The remaining parts of the second embodiment are similar to those of the first embodiment described above. Like reference numerals and characters are used in the second embodiment to designate parts similar to those of the first embodiment.

In the second embodiment, the straight portion T is formed between the first curved portion S1 and the second curved portion S2, but has a short length of not greater than 30 mm. For this reason, light L (indicated by dash-double-dot lines) propagated from the first curved portion S1 to the straight portion T is reflected little from the side surface of the straight portion T and is propagated to the second curved portion S2. The light L propagated to the second curved portion S2 reaches the light-receiving elements 5 while leakage of the propagating light L is reduced as in the first embodiment because the second curved portion S2 in the second embodiment is similar to that in the first embodiment. That is, the position sensor in the second embodiment produces functions and effects similar to those of the first embodiment.

Figure 3:
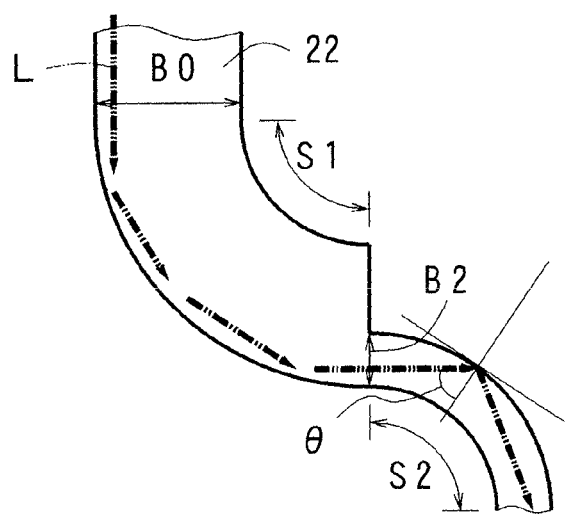
FIG. 3 is a schematic enlarged plan view of the S-shaped portion in a third embodiment of the position sensor of the present invention.

FIG. 3 is an enlarged plan view (a view corresponding to FIG. 1C) of the S-shaped portion in a third embodiment of the position sensor of the present disclosure. In the third embodiment, the first curved portion S1 of the S-shaped portion in the first embodiment shown in FIGS. 1A to 1C has a width constant in the longitudinal direction thereof and equal to the width B0 of the core portion upstream of the S-shaped portion. The second curved portion S2 has a width constant in the longitudinal direction thereof as in the first embodiment, and the width B2 of the entrance of the second curved portion S2 is smaller than the width B0 of the core portion upstream of the S-shaped portion. The entrance of the second curved portion S2 is disposed in part of the exit of the first curved portion S1 which corresponds to the outside of the curve of the first curved portion S1 as seen in the width direction. That is, the connecting portion between the first curved portion S1 and the second curved portion S2 in the S-shaped portion is formed in a stepped shape, and the width of the connecting portion is abruptly narrowed down to the outside of the curve of the first curved portion S1 (the inside of the curve of the second curved portion S2). The remaining parts of the third embodiment are similar to those of the first embodiment described above. Like reference numerals and characters are used in the third embodiment to designate parts similar to those of the first embodiment.

In the third embodiment, the width of the connecting portion between the first curved portion S1 and the second curved portion S2 is abruptly narrowed down to the outside of the curve of the first curved portion S1. However, the light L (indicated by dash-double-dot lines) propagating in the first curved portion S1 leans toward the outside portion of the curve thereof as in the first embodiment. For this reason, most of the light L is propagated to the second curved portion S2. The light L propagated to the second curved portion S2 reaches the light-receiving elements 5 while leakage of the propagating light L is reduced as in the first embodiment because the second curved portion S2 in the third embodiment is similar to that in the first embodiment. That is, the position sensor in the third embodiment produces functions and effects similar to those of the first embodiment.

Figure 4:
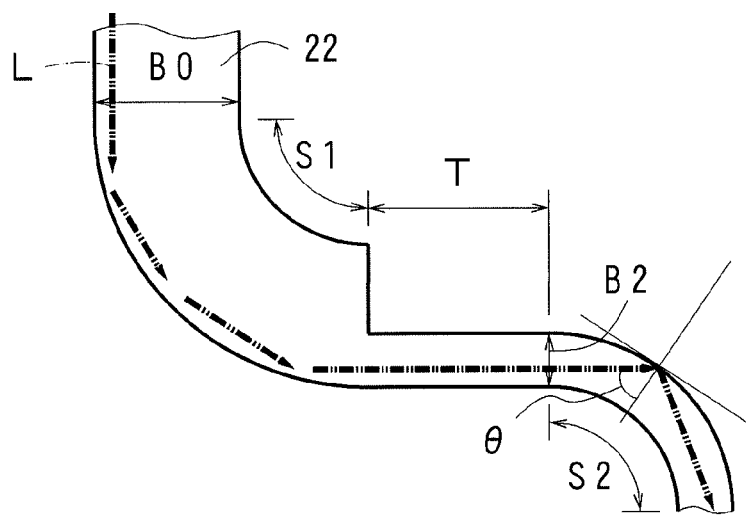
FIG. 4 is a schematic enlarged plan view of the S-shaped portion in a fourth embodiment of the position sensor of the present invention.

FIG. 4 is an enlarged plan view (a view corresponding to FIG. 1C) of the S-shaped portion in a fourth embodiment of the position sensor of the present disclosure. In the fourth embodiment, the S-shaped portion is formed in such a manner that the first curved portion S1 and the second curved portion S2 in the third embodiment shown in FIG. 3 are connected to each other via the straight portion T having a length in the range of greater than 0 (zero) mm to 30 mm. The entrance of the straight portion T is disposed in part of the exit of the first curved portion S1 which corresponds to the outside of the curve of the first curved portion S1 as seen in the width direction. The straight portion T has a width constant in the longitudinal direction thereof and equal to the width B2 of the entrance of the second curved portion S2. That is, the connecting portion between the first curved portion S1 and the straight portion T is formed in a stepped shape, and the width of the connecting portion is abruptly narrowed down to the outside of the curve of the first curved portion S1. The remaining parts of the fourth embodiment are similar to those of the third embodiment described above. Like reference numerals and characters are used in the fourth embodiment to designate parts similar to those of the third embodiment.

In the fourth embodiment, the width of the connecting portion between the first curved portion S1 and the straight portion T is abruptly narrowed down to the outside of the curve of the first curved portion S1. However, the light L (indicated by dash-double-dot lines) propagating in the first curved portion S1 leans toward the outside portion of the curve thereof as in the third embodiment. For this reason, most of the light L is propagated to the straight portion T. In addition, the light L is reflected little from the side surface of the straight portion T and is propagated to the second curved portion S2 as in the second embodiment shown in FIG. 2. The light L propagated to the second curved portion S2 reaches the light-receiving elements 5 while leakage of the propagating light L is reduced as in the first embodiment because the second curved portion S2 in the fourth embodiment is similar to that in the first embodiment. That is, the position sensor in the fourth embodiment produces functions and effects similar to those of the first embodiment.

Figure 5:
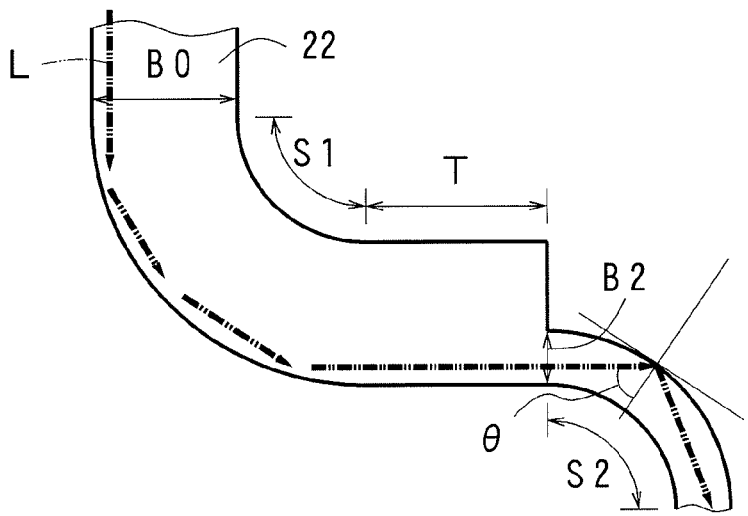
FIG. 5 is a schematic enlarged plan view of the S-shaped portion in a fifth embodiment of the position sensor of the present invention.

FIG. 5 is an enlarged plan view (a view corresponding to FIG. 1C) of the S-shaped portion in a fifth embodiment of the position sensor of the present disclosure. In the fifth embodiment, the width of the first curved portion S1 and the width of the straight portion T in the fourth embodiment shown in FIG. 4 are equal to each other. The entrance of the second curved portion S2 is disposed in part of the exit of the straight portion T which corresponds to the outside of the curve of the first curved portion S1 as seen in the width direction. That is, the connecting portion between the straight portion T and the second curved portion S2 is formed in a stepped shape, and the width of the connecting portion is abruptly narrowed down to the outside of the curve of the first curved portion S1. The remaining parts of the fifth embodiment are similar to those of the fourth embodiment described above. Like reference numerals and characters are used in the fifth embodiment to designate parts similar to those of the fourth embodiment.

In the fifth embodiment, the light L (indicated by dash-double-dot lines) propagating while leaning toward the outside portion of the curve of the first curved portion S1 is also propagated in the straight portion T while leaning toward part of the straight portion T which corresponds to the outside portion without any change. In addition, the light L propagated to the straight portion T is reflected little from the side surface of the straight portion T and is propagated to the second curved portion S2 as in the fourth embodiment. Thus, most of the light L propagating in the straight portion T is propagated to the second curved portion S2 although the width of the connecting portion between the straight portion T and the second curved portion S2 is abruptly narrowed down to the outside portion of the straight portion T as described above. The light L propagated to the second curved portion S2 reaches the light-receiving elements 5 while leakage of the propagating light L is reduced as in the first embodiment because the second curved portion S2 in the fifth embodiment is similar to that in the first embodiment. That is, the position sensor in the fifth embodiment produces functions and effects similar to those of the first embodiment.

Figure 6:
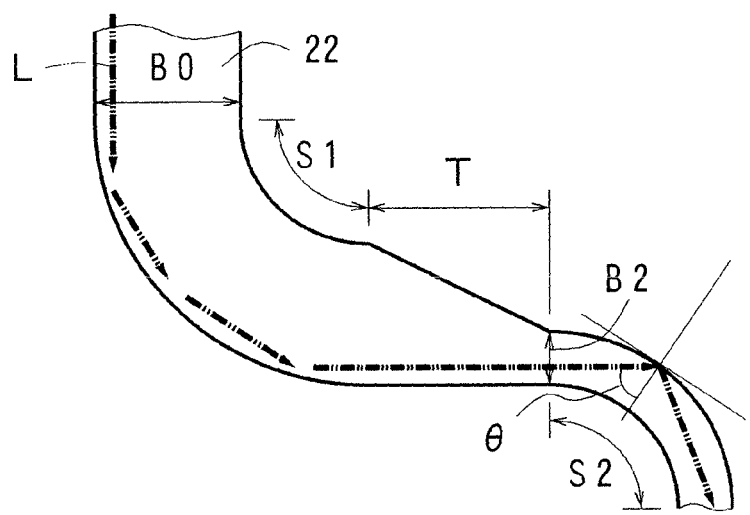
FIG. 6 is a schematic enlarged plan view of the S-shaped portion in a sixth embodiment of the position sensor of the present invention.

FIG. 6 is an enlarged plan view (a view corresponding to FIG. 1C) of the S-shaped portion in a sixth embodiment of the position sensor of the present disclosure. In the sixth embodiment, the width of the entrance of the straight portion T in the fifth embodiment shown in FIG. 5 is equal to the width of the first curved portion S1, and the width of the exit of the straight portion T is equal to the width of the second curved portion S2. That is, the straight portion T is formed in such a tapered shape that the width thereof gradually decreases from the entrance thereof toward the exit thereof. The remaining parts of the sixth embodiment are similar to those of the fifth embodiment described above. Like reference numerals and characters are used in the sixth embodiment to designate parts similar to those of the fifth embodiment.

In the sixth embodiment, the light L (indicated by dash-double-dot lines) propagating while leaning toward the outside portion of the curve of the first curved portion S1 is also propagated in the straight portion T while leaning toward part of the straight portion T which corresponds to the outside portion without any change. In addition, the light L propagated to the straight portion T is reflected little from the side surface of the straight portion T and is propagated to the second curved portion S2 as in the fifth embodiment. The light L propagated to the second curved portion S2 reaches the light-receiving elements 5 while leakage of the propagating light L is reduced as in the first embodiment because the second curved portion S2 in the sixth embodiment is similar to that in the first embodiment. That is, the position sensor in the sixth embodiment produces functions and effects similar to those of the first embodiment.

Figure 7:
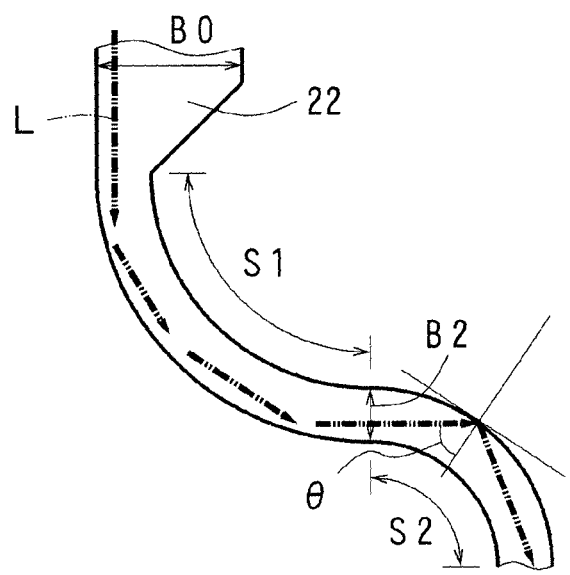
FIG. 7 is a schematic enlarged plan view of the S-shaped portion in a seventh embodiment of the position sensor of the present invention.

FIG. 7 is an enlarged plan view (a view corresponding to FIG. 1C) of the S-shaped portion in a seventh embodiment of the position sensor of the present disclosure. In the seventh embodiment, the width of the first curved portion S1 in the third embodiment shown in FIG. 3 is equal to the width of the second curved portion S2 and is smaller. That is, the width of the S-shaped portion is constant and equal throughout in the longitudinal direction thereof, and is smaller than the width B0 of the core portion upstream of the S-shaped portion. The remaining parts of the seventh embodiment are similar to those of the third embodiment described above. Like reference numerals and characters are used in the seventh embodiment to designate parts similar to those of the third embodiment.

In the seventh embodiment, the width of the S-shaped portion is constant and equal in the longitudinal direction thereof, and is smaller than the width B0 of the core portion upstream of the S-shaped portion. For this reason, the light L (indicated by dash-double-dot lines) propagating while leaning toward the outside portion of the curve of the first curved portion S1 is also propagated to the second curved portion S2 without any change also in the seventh embodiment. The light L propagated to the second curved portion S2 reaches the light-receiving elements 5 while leakage of the propagating light L is reduced as in the first embodiment because the second curved portion S2 in the seventh embodiment is similar to that in the first embodiment. That is, the position sensor in the seventh embodiment produces functions and effects similar to those of the first embodiment.

Figure 8:
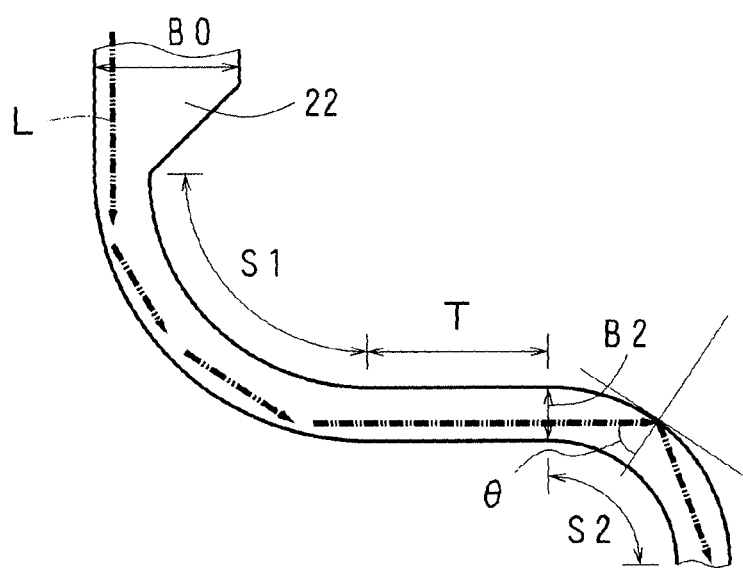
FIG. 8 is a schematic enlarged plan view of the S-shaped portion in an eighth embodiment of the position sensor of the present invention.

FIG. 8 is an enlarged plan view (a view corresponding to FIG. 1C) of the S-shaped portion in an eighth embodiment of the position sensor of the present disclosure. In the eighth embodiment, the S-shaped portion is formed in such a manner that the first curved portion S1 and the second curved portion S2 in the seventh embodiment shown in FIG. 7 are connected to each other via the straight portion T having a length in the range of greater than 0 (zero) mm to 30 mm. The straight portion T has a width constant in the longitudinal direction thereof and equal to the width of the first curved portion S1 (the width of the second curved portion S2). The remaining parts of the eighth embodiment are similar to those of the seventh embodiment described above. Like reference numerals and characters are used in the eighth embodiment to designate parts similar to those of the seventh embodiment.

In the eighth embodiment, the light L (indicated by dash-double-dot lines) propagating while leaning toward the outside portion of the curve of the first curved portion S1 is also propagated in the straight portion T while leaning toward part of the straight portion T which corresponds to the outside portion without any change. In addition, the light L propagated to the straight portion T is reflected little from the side surface of the straight portion T and is propagated to the second curved portion S2 as in the second embodiment shown in FIG. 2. The light L propagated to the second curved portion S2 reaches the light-receiving elements 5 while leakage of the propagating light L is reduced as in the first embodiment because the second curved portion S2 in the eighth embodiment is similar to that in the first embodiment. That is, the position sensor in the eighth embodiment produces functions and effects similar to those of the first embodiment.

Although the cores 22 having the S-shaped portion formed therein are part of the second outer peripheral core portion 2C in the aforementioned embodiments, all of the cores 22 may have the S-shaped portion formed therein.

Figure 9:
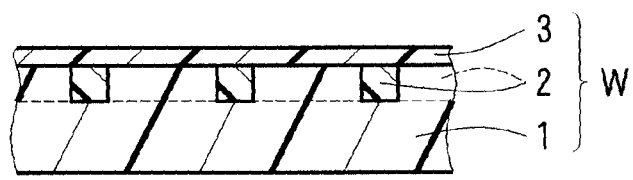
FIG. 9 is a schematic enlarged sectional view of a midsection of a modification of an optical waveguide constituting the position sensor.

The optical waveguide W has a cross-sectional structure shown in FIG. 1B in the aforementioned embodiments, but may have other cross-sectional structures. For example, as shown in sectional view in FIG. 9, the optical waveguide W may have a cross-sectional structure obtained by turning the cross-sectional structure shown in FIG. 1B upside down. Specifically, the optical waveguide W is configured such that the cores 2 are buried in a front surface portion of the sheet-like under cladding layer 1 so that the top surface of the cores 2 is flush with the front surface of the under cladding layer 1, and such that the sheet-like over cladding layer 3 is formed while covering the front surface of the under cladding layer 1 and the top surface of the cores 2.

Figure 10A:
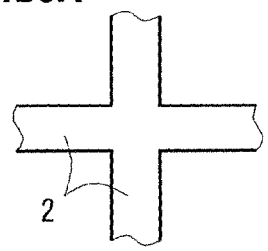
FIGS. 10A to 10F are schematic enlarged plan views of configurations of intersection of cores in a lattice-shaped portion in the position sensor.
Figure 10B:
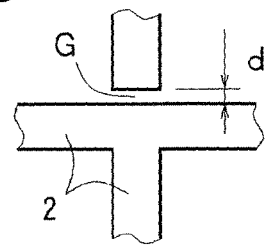
Figure 10C:
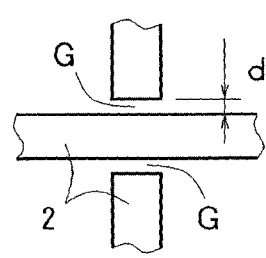
Figure 10D:
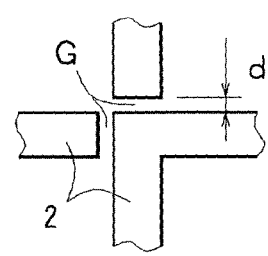
Figure 10E:
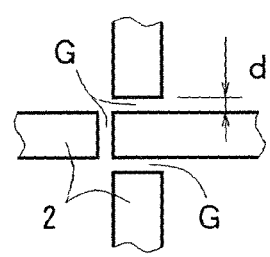
Figure 10F:
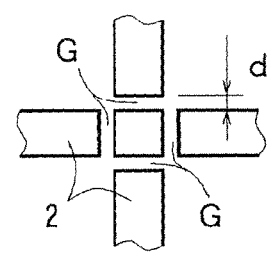

Each intersection of the cores 2 in the lattice-shaped portion is generally configured to be continuous in all of the four intersecting directions as shown in enlarged plan view in FIG. 10A in the aforementioned embodiments, but may be of other configurations. For example, each intersection may be separated by a gap G to become discontinuous only in one of the intersecting directions, as shown in FIG. 10B. The gap G is made of the material for the formation of the under cladding layer 1 or the over cladding layer 3. The gap G has a width d greater than 0 (zero) (it is only necessary that the gap G is formed) and generally not greater than 20 μm. Likewise, as shown in FIGS. 10C and 10D, each intersection may be discontinuous in two intersecting directions (in two opposed directions in FIG. 10C, and in two adjacent directions in FIG. 10D). Alternatively, each intersection may be discontinuous in three intersecting directions, as shown in FIG. 10E. Also, each intersection may be discontinuous in all of the four intersecting directions, as shown in FIG. 10F. Further, the cores 2 may be in a lattice-shape including two or more types of intersections shown in FIGS. 10A to 10F. The term "lattice-shape" formed by the linear cores 2 as used in the present disclosure shall be meant to include a lattice-shape in which part or all of the intersections are formed in the aforementioned manner.

Figure 11A:
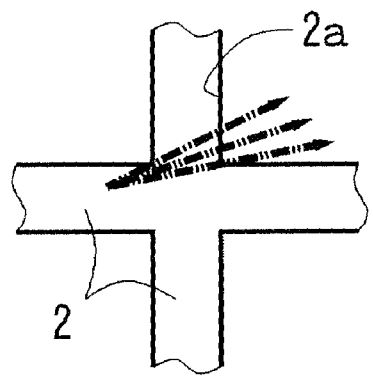
FIGS. 11A and 11B are schematic enlarged plan views of paths of light at intersections of the cores in the lattice-shaped portion.
Figure 11B:
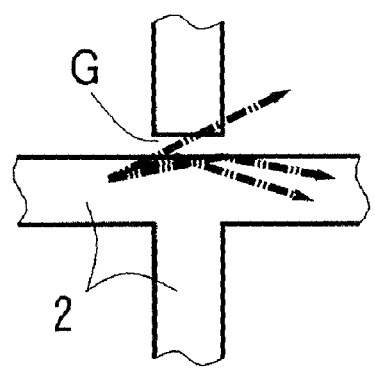

In particular, intersections which are discontinuous in at least one intersecting direction as shown in FIGS. 10B to 10F are capable of reducing intersection losses of light. At an intersection which is continuous in all of the four intersecting directions as shown in FIG. 11A, attention will be given on one intersecting direction (an upward direction as seen in FIG. 11A). Then, part of light incident on the intersection reaches a side surface 2a of a first core 2 perpendicular to a second core 2 through which the light travels, and is transmitted through the first core 2 (with reference to dash-double-dot arrows in FIG. 11A) because the incident angle at the side surface 2a is smaller than the critical angle. Such light transmission occurs also in the opposite intersecting direction (a downward direction as seen in FIG. 11A). As shown in FIG. 11B, on the other hand, when an intersection is made discontinuous by the gap G in one intersecting direction (an upward direction as seen in FIG. 11B), an interface between the gap G and a core 2 is formed. Then, part of light transmitted through the core 2 with reference to FIG. 11A is not transmitted through the interface but is reflected from the interface to continue traveling through the core 2 (with reference to dash-double-dot arrows in FIG. 11B) because the incident angle at the interface is greater than the critical angle. Based on these facts, the reduction in intersection losses of light is achieved by making the intersection discontinuous in at least one intersecting direction as mentioned above. As a result, the sensitivity for sensing of the pressed position with the tip of the pen or the like is increased.

The optical waveguide W has a rectangular sheet-like shape in the aforementioned embodiments, but may have other polygonal sheet-like shapes so long as the optical waveguide W includes the cores 2 arranged in a lattice shape.

Figure 12A:
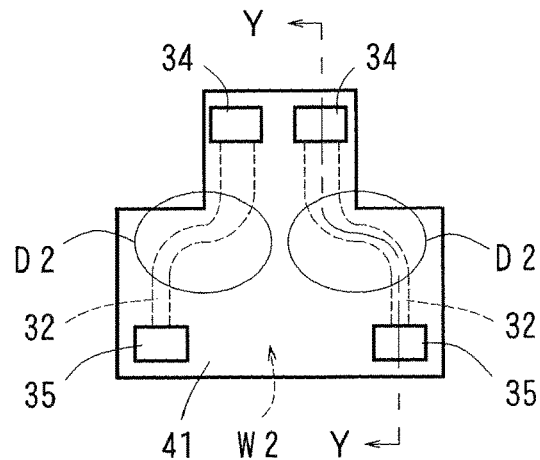
FIG. 12A is a schematic plan view of a first embodiment of an optical circuit board according to the present invention.
Figure 12B:
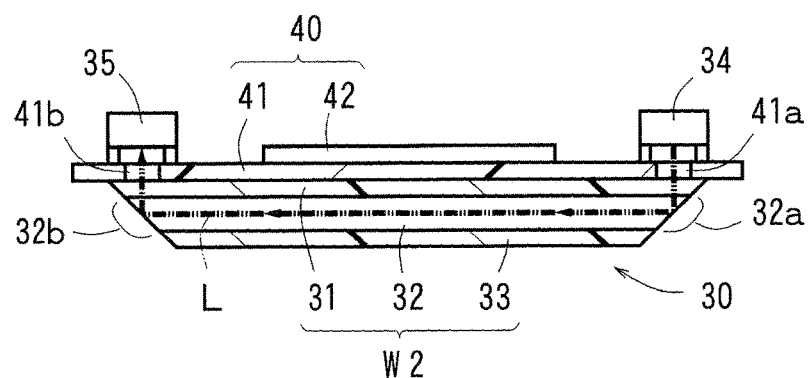
FIG. 12B is a schematic sectional view taken along the line Y-Y of FIG. 12A.

FIG. 12A is a plan view of a first embodiment of an optical circuit board according to the present disclosure. FIG. 12B is a vertical sectional view taken along the central axis of a core shown in FIG. 12A (a sectional view taken along the line Y-Y of FIG. 12A). Like the optical circuit board 70 of the related art (with reference to FIG. 18), an optical circuit board 30 according to this embodiment is also stacked on an electrical circuit board 40. As shown in plan view of FIG. 12A, the optical circuit board 30 includes two light-emitting elements 34 on a first end side (the upper end side as seen in FIG. 12A), and two light-receiving elements 35 on a second end side (the lower end side as seen in FIG. 12A). The distance between the two light-receiving elements 35 on the second end side is greater than the distance between the two light-emitting elements 34 on the first end side. Thus, the optical circuit board 30 has a smaller width on the first end side and a greater width on the second end side, and the distance between adjacent cores 32 which propagate light between the light-emitting elements 34 and the light-receiving elements 35 is greater on the light-receiving elements 35 side than on the light-emitting elements 34 side. Accordingly, the cores 32 are curved in an S-shape in a longitudinally middle portion (regions surrounded by ellipses D2 in FIG. 12A). It should be noted that the width of the cores 32 is shown in exaggeration.

Figure 12C:
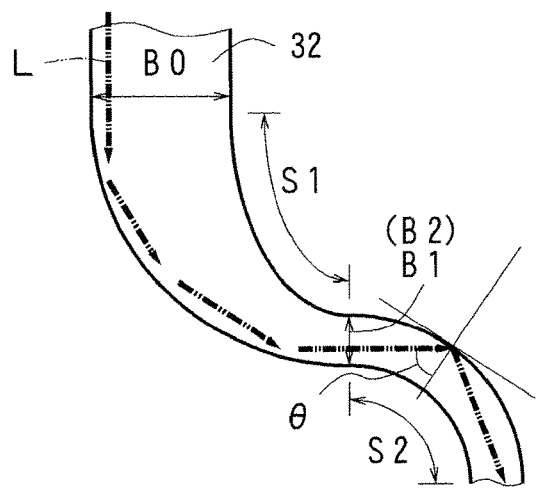
FIG. 12C is a schematic enlarged plan view of the S-shaped portion of a core formed in regions surrounded by ellipses D2 of FIG. 12A.

As shown in enlarged plan view in FIG. 12C, the S-shaped portion of each core 32 in this embodiment includes the first curved portion S1 upstream as seen in the direction of light propagation, and the second curved portion S2 downstream as seen in the direction of light propagation and curved in a direction opposite to the first curved portion S1. The first curved portion S1 and the second curved portion S2 are connected in contiguous relation. The width of the entrance (the entrance of the first curved portion S1) of the S-shaped portion is equal to the width B0 of the core portion upstream of the S-shaped portion. The width of the first curved portion S1 decreases gradually from the entrance of the first curved portion S1 toward the exit thereof. The width B1 of the exit of the first curved portion S1 is equal to the width B2 of the entrance of the second curved portion S2. The second curved portion S2 has a width constant in the longitudinal direction thereof.

Figure 18:
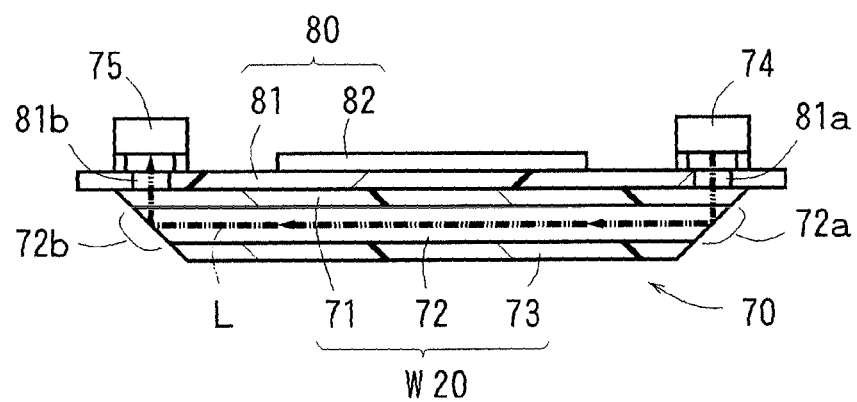
FIG. 18 is a schematic vertical sectional view of an optical circuit board of the related art.

The remaining parts are similar to those of the electrical circuit board 80 and the optical circuit board 70 of the related art shown in FIG. 18. Specifically, in FIG. 12B, the reference numeral 41 designates an insulative layer; 42 designates an electrical interconnect line (not shown in FIG. 12A) formed on the front surface of the insulative layer 41; the reference characters 41a and 41b designate through holes formed in the insulative layer 41; W2 designates an optical waveguide; 32a and 32b designate light reflecting surfaces formed in opposite end portions of each core 32; 31 designates a first cladding layer; and 33 designates a second cladding layer. The cores 32 have respective first end portions optically connected to the light-emitting elements 34, and respective second end portions optically connected to the light-receiving elements 35. Light L (indicated by dash-double-dot lines) is propagated from the light-emitting elements 34 through the cores 32 to the light-receiving elements 35.

Setting the characteristic core widths of the S-shaped portion in each of the cores 32 reduces leakage of light L in the S-shaped portion (reduces the propagation loss of the light L). Specifically, the width B1 of the exit of the upstream first curved portion S1 in the S-shaped portion is smaller than the width B0 of the core portion upstream of the S-shaped portion, as shown in FIG. 12C. Thus, the propagating light L (indicated by dash-double-dot lines) is propagated to the downstream second curved portion S2 while leaning toward the outside portion of the curve of the upstream first curved portion S1. Then, the light L is propagated near the entrance of the second curved portion S2 while leaning toward the inside of the curve, and reaches the outside side surface of the curve of the second curved portion S2 in a concentrated manner. The incident angle θ of the light L reaching the outside side surface of the curve of the second curved portion S2 is greater than the critical angle because the width B2 of the entrance of the second curved portion S2 is equal to the width B1 of the exit of the first curved portion S1 and smaller and because the width of the second curved portion S2 is constant in the longitudinal direction thereof. For this reason, most of the light L is reflected from the aforementioned side surface, so that the leakage of the light L is reduced. The light L reaches the light-receiving elements 35 while leakage of the propagating light L is reduced in the cores 32.

From the viewpoints of further reducing the amount of leakage of propagating light in the second curved portion S2 and thereby further suppressing the decrease in the intensity of light received by the light-receiving elements 35, it is preferable that a relationship between the width (B1; in μm) of the exit of the first curved portion S1, the radius of curvature (R1; in mm) of the first curved portion S1, the refractive index (K1) of the cores 32 with the S-shaped portion formed therein, and the refractive index (K2) of the second cladding layer 33 covering the side surfaces of the cores 32 is established so as to satisfy Formula (3) below. It should be noted that the radius of curvature (R1) of the first curved portion S1 is the radius of curvature of a widthwise center line of the first curved portion S1.

[MATH. 6]

$$B1/R1 \leq 800 \times (K1-K2) \qquad (3)$$

The core width of the first curved portion S1 at both the entrance and the exit is preferably in the range of 1 to 80 μm, for example. The radius of curvature (R1) of the first curved portion S1 is preferably in the range of 0.5 to 5.0 mm, for example. The difference (K1−K2) in refractive index is preferably in the range of 0.005 to 0.05, for example.

Figure 13:
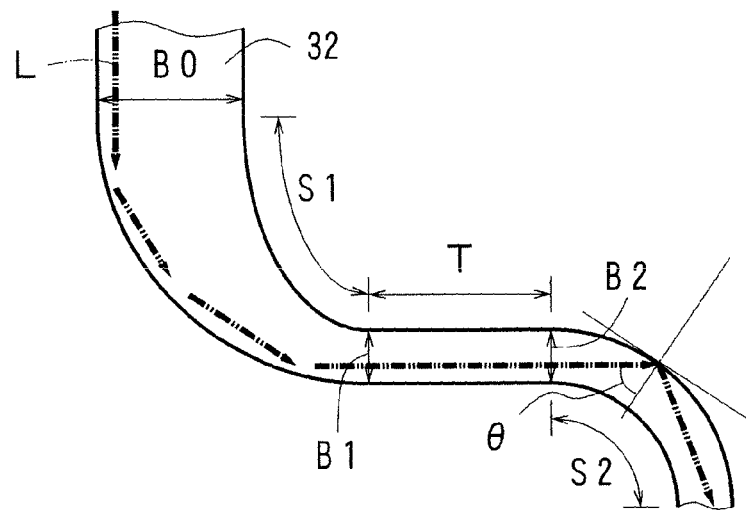
FIG. 13 is a schematic enlarged plan view of the S-shaped portion in a second embodiment of the optical circuit board of the present invention.

FIG. 13 is an enlarged plan view (a view corresponding to FIG. 12C) of the S-shaped portion in a second embodiment of the optical circuit board of the present disclosure. In the second embodiment, the S-shaped portion is formed in such a manner that the first curved portion S1 and the second curved portion S2 in the first embodiment shown in FIGS. 12A to 12C are connected to each other via the straight portion T having a length in the range of greater than 0 (zero) mm to 30 mm. The straight portion T has a width constant in the longitudinal direction thereof and equal to the width B1 of the exit of the first curved portion S1 (the width B2 of the entrance of the second curved portion S2). The remaining parts of the second embodiment are similar to those of the first embodiment described above. Like reference numerals and characters are used in the second embodiment to designate parts similar to those of the first embodiment.

In the second embodiment, the width B1 of the exit of the upstream first curved portion S1 in the S-shaped portion is smaller than the width B0 of the core portion upstream of the S-shaped portion. Thus, the light L (indicated by dash-double-dot lines) propagating in the S-shaped portion is propagated to the straight portion T while leaning toward the outside portion of the curve of the upstream first curved portion S1. The straight portion T has a short length of not greater than 30 mm. For this reason, light L propagated from the first curved portion S1 to the straight portion T is reflected little from the side surface of the straight portion T and is propagated to the second curved portion S2 while leaning. Then, the light L is propagated near the entrance of the second curved portion S2 while leaning toward the inside of the curve, and reaches the outside side surface of the curve of the second curved portion S2 in a concentrated manner, as in the first embodiment. Most of the light L reaching the side surface is reflected from the aforementioned side surface, so that the leakage of the light L is reduced because the second curved portion S2 in the second embodiment is similar to that in the first embodiment. In this manner, the light L propagated to the second curved portion S2 reaches the light-receiving elements 35 while leakage of the propagating light L is reduced as in the first embodiment. That is, the optical circuit board in the second embodiment produces functions and effects similar to those of the first embodiment.

Figure 14:
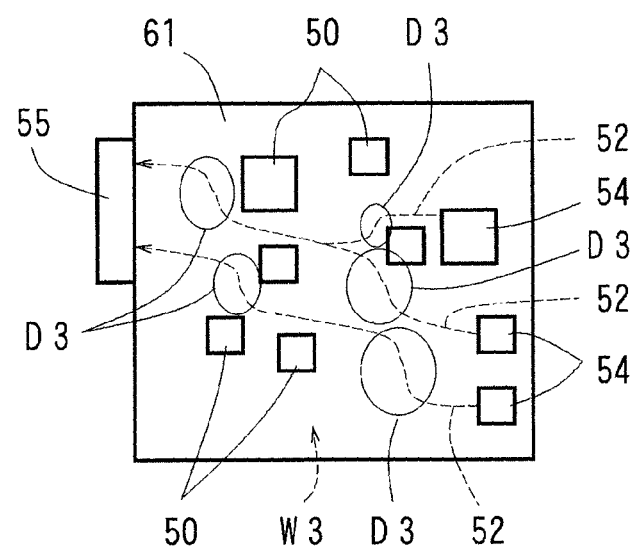
FIG. 14 is a schematic plan view of a third embodiment of the optical circuit board of the present invention.

FIG. 14 is a plan view of a third embodiment of the optical circuit board of the present disclosure. In the third embodiment, a large number of electronic components 50 including optical elements 54, IC chip interfaces, resistors, capacitors, coils and the like are disposed in dispersed locations on a surface of an insulative layer 61. An optical waveguide W3 includes cores S2 having respective first end portions optically connected to the optical elements 54, and respective second end portions optically connected to an optical fiber connecting connector 55. Part (regions surrounded by ellipses D3 in FIG. 14) of each of the cores 52 is formed in an S-shape because the cores 52 are arranged and formed so as to be clear of the dispersed electronic components 50. The characteristic core widths of the S-shaped portion are set as in the first embodiment shown in FIG. 12C or the second embodiment shown in FIG. 13. The remaining parts of the third embodiment are similar to those of the first or second embodiment described above. The optical circuit board in the third embodiment produces functions and effects similar to those of the first or second embodiment.

Figure 15A:
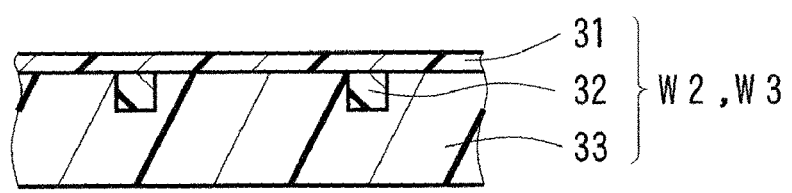
FIGS. 15A and 15B are schematic enlarged sectional views of modifications of an optical waveguide constituting the optical circuit board.
Figure 15B:
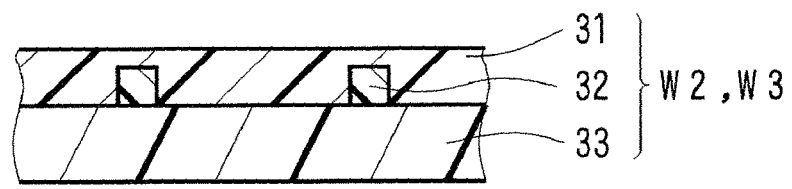

The cross-sectional structure (a cross-sectional structure corresponding to those of FIGS. 1B and 9) of each of the optical waveguides W2 and W3 in the aforementioned embodiments of the optical circuit board may be a cross-sectional structure shown in FIG. 15A or a cross-sectional structure shown in FIG. 15B. In the cross-sectional structure shown in FIG. 15A, the cores 32 in a protruding shape are formed on the lower surface of the first cladding layer 31, and the second cladding layer 33 is formed on the lower surface of the first cladding layer 31 while covering the side and lower surfaces of the cores 32. The cross-sectional structure shown in FIG. 15B is obtained by turning the cross-sectional structure shown in FIG. 15A upside down. Specifically, the cores 32 are buried in the lower surface portion of the first cladding layer 31 so that the lower surface of the cores 32 is flush with the lower surface of the first cladding layer 31, and the second cladding layer 33 is formed while covering the lower surface of the first cladding layer 31 and the lower surface of the cores 32.

In the aforementioned embodiments of the position sensor and the optical circuit board, the width of the downstream second curved portion S2 of the S-shaped portion is constant in the longitudinal direction thereof. However, the width of the downstream second curved portion S2 may be gradually decreased from the entrance thereof toward the exit thereof because the light propagation loss in the S-shaped portion tends to decrease with the decreasing width of the second curved portion S2.

The optical waveguides W, W2 and W3 including the cores 22 and 32 each having the S-shaped portion are employed for the position sensor and the optical circuit board in the aforementioned embodiments. However, the optical waveguides W, W2 and W3 may be optical waveguides used for other applications, e.g. for opto-electric hybrid boards.

Next, inventive examples of the present disclosure will be described in conjunction with comparative examples. It should be noted that the present disclosure is not limited to the inventive examples.

EXAMPLES

[Material for Formation of Under Cladding Layer and Over Cladding Layer]

Component a: 60 parts by weight of an epoxy resin (YX7400 available from Mitsubishi Chemical Corporation).

Component b: 40 parts by weight of an epoxy resin (EHPE3150 available from Daicel Corporation).

Component c: 1 part by weight of a photo-acid generator (CPI-101A available from San-Apro Ltd.).

A material for the formation of an under cladding layer and an over cladding layer was prepared by mixing these components a to c together.

[Material for Formation of Cores]

Component d: 100 parts by weight of an epoxy resin (EHPE3150 available from Daicel Corporation).

Component e: 1 part by weight of a photo-acid generator (SP-170 available from ADEKA Corporation).

Component f: 50 parts by weight of ethyl lactate (a solvent available from Wako Pure Chemical Industries, Ltd.).

A material for the formation of cores was prepared by mixing these components d to f together.

Inventive Example 1

An optical waveguide in which a portion of each of the cores was formed in an S-shape was produced with the use of the aforementioned materials. The S-shaped portion included a first curved portion S1 having a width decreasing gradually from the entrance thereof toward the exit thereof, and a second curved portion S2 having an entrance with a width B2 smaller than the width B0 of a core portion upstream of the S-shaped portion (with reference to FIG. 1C). The width B2 of the entrance of the second curved portion S2 was set to a variety of values listed in TABLE 1 below. Other dimensions, refractive indices and the like were also listed in TABLE 1. The width B0 of the core portion upstream of the S-shaped portion was 200 µm. The under cladding layer had a thickness of 25 µm. The cores had a thickness of 30 µm. The over cladding layer had a thickness of 70 µm as measured from the top surface of the cores.

Comparative Example 1

Comparative Example 1 was provided in which the S-shaped portion in Inventive Example 1 had a greater constant width of 200 µm. The remaining parts of Comparative Example 1 were similar to those of Inventive Example 1.

[Measurement of Light Propagation Loss]

A light-emitting element (XH85-S0603-2s available from Optowell Co., Ltd.) was connected to a first end surface of the cores of the aforementioned optical waveguide, and a light-receiving element (s10226 available from Hamamatsu Photonics K.K.) was connected to a second end surface of the cores thereof. Then, a light propagation loss (α) was calculated in accordance with Formula (4) below based on the intensity (E) of light emitted from the light-emitting element and the intensity (F) of light received by the light-receiving element, and was listed in TABLE 1 below.

[MATH. 7]

$$\alpha = -10 \log_{10}(F/E) \tag{4}$$

TABLE 1

| | First curved portion | | | Second curved portion | | | | | | | | |
|---|---|---|---|---|---|---|---|---|---|---|---|---|
| | Entrance width (μm) | Exit width (μm) | Radius of curvature (mm) | Entrance width B2 (μm) | Exit width (μm) | Radius of curvature R2 (mm) | Refractive index K1 of cores | Refractive index K2 of over cladding layer | Difference K1 − K2 in refractive index | Intensity E of emitted light (mW) | Intensity F of received light (mW) | Light propagation loss α (dB) |
| Inv. Ex. 1 | 200 | 15 | 10 | 15 | 15 | 10 | 1.507 | 1.497 | 0.010 | 0.524 | 0.044 | 10.91 |
| | | 20 | | 20 | | | | | | | 0.044 | 10.93 |
| | | 40 | | 40 | | | | | | | 0.043 | 11.04 |
| | | 80 | | 80 | | | | | | | 0.014 | 15.78 |
| Comp. Ex. 1 | | 200 | | 200 | 200 | | | | | | 0.0017 | 25.04 |

The results in TABLE 1 show that the light propagation loss is low in Inventive Example 1 as compared with that in Comparative Example 1. From this, it is found to be effective in lowering the light propagation loss that the width B2 of the entrance of the second curved portion of the S-shaped portion is smaller than the width B0 of the core portion upstream of the S-shaped portion. It should be noted that Inventive Example 1 satisfies Formula (1) described above.

Inventive Examples 2 to 4 and Comparative Examples 2 and 3

Inventive Examples 2 to 4 and Comparative Examples 2 and 3 were provided by changing the material for the formation of the over cladding layer in Inventive Example 1 and Comparative Example 1 to thereby change the refractive index of the over cladding layer. Then, the light propagation loss was calculated in the same manner as in Inventive Example 1. The results were listed in TABLES 2 and 3 below.

TABLE 2

| | First curved portion | | | Second curved portion | | | | | | | | |
|---|---|---|---|---|---|---|---|---|---|---|---|---|
| | Entrance width (μm) | Exit width (μm) | Radius of curvature (mm) | Entrance width B2 (μm) | Exit width (μm) | Radius of curvature R2 (mm) | Refractive index K1 of cores | Refractive index K2 of over cladding layer | Difference K1 − K2 in refractive index | Intensity E of emitted light (mW) | Intensity F of received light (mW) | Light propagation loss α (dB) |
| Inv. Ex. 2 | 200 | 15 | 10 | 15 | 15 | 10 | 1.507 | 1.492 | 0.015 | 0.692 | 0.061 | 10.55 |
| | | 20 | | 20 | | | | | | | 0.061 | 10.54 |
| | | 40 | | 40 | | | | | | | 0.060 | 10.60 |
| | | 80 | | 80 | | | | | | | 0.055 | 10.97 |
| | | 120 | | 120 | | | | | | | 0.013 | 17.17 |
| Comp. Ex. 2 | | 200 | | 200 | 200 | | | | | | 0.0022 | 24.98 |

TABLE 3

| | First curved portion | | | Second curved portion | | | | | | | | |
|---|---|---|---|---|---|---|---|---|---|---|---|---|
| | Entrance width (μm) | Exit width (μm) | Radius of curvature (mm) | Entrance width B2 (μm) | Exit width (μm) | Radius of curvature R2 (mm) | Refractive index K1 of cores | Refractive index K2 of over cladding layer | Difference K1 − K2 in refractive index | Intensity E of emitted light (mW) | Intensity F of received light (mW) | Light propagation loss α (dB) |
| Inv. Ex. 3 | 200 | 15 | 10 | 15 | 15 | 10 | 1.507 | 1.487 | 0.020 | 0.542 | 0.076 | 10.20 |
| | | 20 | | 20 | | | | | | | 0.076 | 10.19 |
| | | 40 | | 40 | | | | | | | 0.075 | 10.25 |
| | | 80 | | 80 | | | | | | | 0.069 | 10.63 |
| | | 120 | | 120 | | | | | | | 0.062 | 11.09 |
| | | 160 | | 160 | | | | | | | 0.012 | 18.36 |
| Comp. Ex. 3 | | 200 | | 200 | 200 | | | | | | 0.0025 | 25.02 |
| Inv. Ex. 4 | | 15 | | 15 | 15 | | | 1.482 | 0.025 | 0.864 | 0.089 | 9.87 |

The results in TABLES 2 and 3 show that the light propagation loss is low in Inventive Examples 2 to 4 as compared with that in Comparative Examples 2 and 3. From this, it is found to be effective in lowering the light propagation loss that the width B2 of the entrance of the second curved portion of the S-shaped portion is smaller than the width B0 of the core portion upstream of the S-shaped portion. It should be noted that Inventive Examples 2 to 4 satisfy Formula (1) described above.

An optical waveguide including cores having each of the S-shaped portions shown in FIGS. 2 to 8 provided results having tendencies similar to those in Inventive Examples 1 to 4.

[Position Sensor]

A position sensor shown in FIG. 1A including a second outer peripheral core portion with each S-shaped portion formed therein was produced. A light-emitting element and a light-receiving element employed in the position sensor were similar to those described above.

[Measurement of Intensity of Received Light]

In the position sensor, the intensity of light received by the light-receiving element was measured while an input region was not pressed. As a result, in the position sensor including the second outer peripheral core portion having each of the S-shaped portions shown in FIG. 1C and FIGS. 2 to 8, the intensity of the received light was equal throughout the input region. On the other hand, in the position sensor including the second outer peripheral core portion having each of the S-shaped portions of Comparative Examples 1 to 3, the intensity of the received light was low and unequal in portions corresponding to the cores having each of the S-shaped portions.

Experimental Example 1

An optical waveguide in which a portion of each core was formed in an S-shape was produced with the use of the same materials as in Inventive Example 1. The S-shaped portion included: a first curved portion having an entrance with a width of 200 µm, an exit with a width of 40 µm, and a radius of curvature of 10 mm; and a second curved portion having an entrance with a width of 40 µm, an exit with a width of 15 µm, and a radius of curvature of 10 mm. The width of the entrance of the first curved portion was equal to the width of a core portion upstream of the S-shaped portion. A straight portion was provided between the first curved portion and the second curved portion. The length of the straight portion was increased from 0 (zero) mm in increments of 1.2 mm. The light propagation loss was calculated for each length of the straight portion in the same manner as in Inventive Example 1. The results were shown in the graph of FIG. 16.

Experimental Example 2

The first curved portion in Experimental Example 1 had a greater constant width of 200 µm. The second curved portion in Experimental Example 1 had an entrance with a width of 200 µm, an exit with a width of 15 µm, and a radius of curvature of 10 mm. The light propagation loss was calculated in the same manner as in Experimental Example 1. The results were shown in the graph of FIG. 16 in conjunction with the results of Experimental Example 1.

Figure 16:
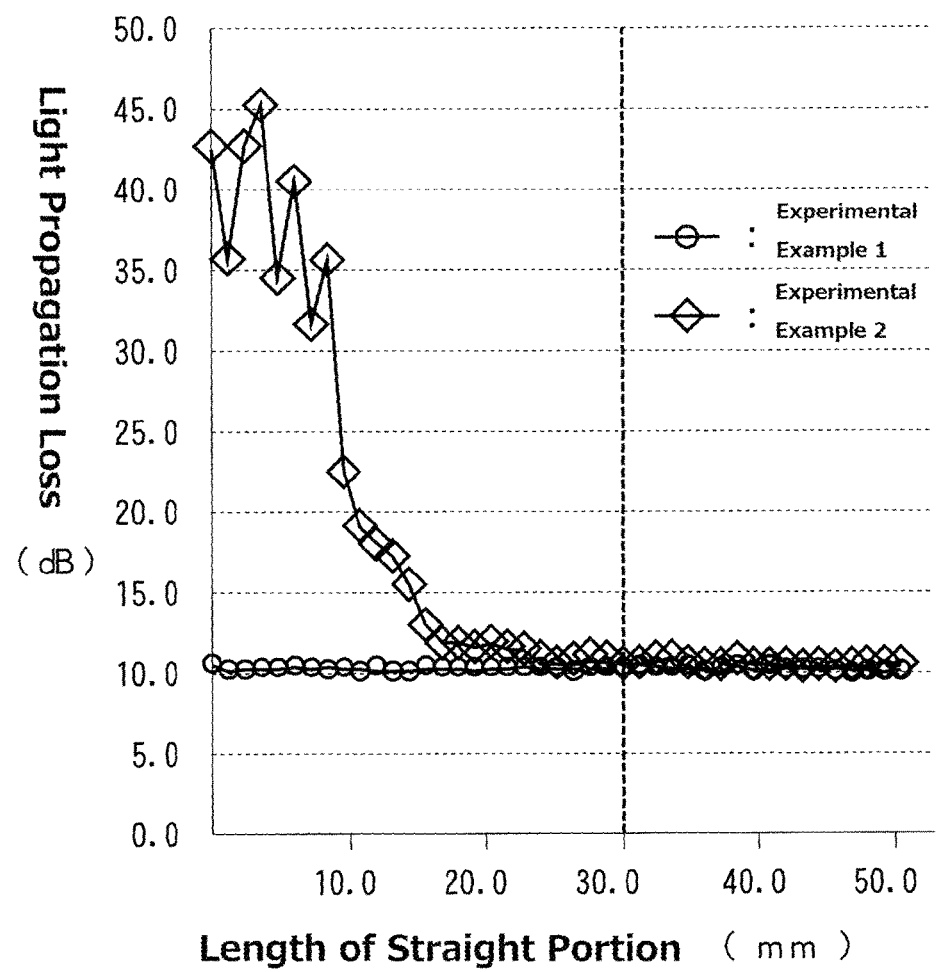
FIG. 16 is a graph showing results of experimental examples 1 and 2.
Figure 17A:
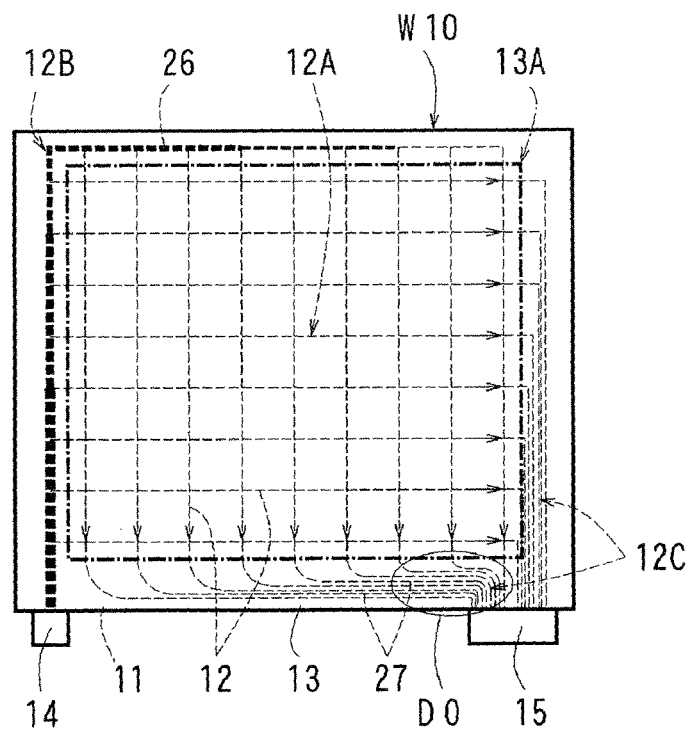
FIG. 17A is a schematic plan view of a position sensor of the related art.
Figure 17B:
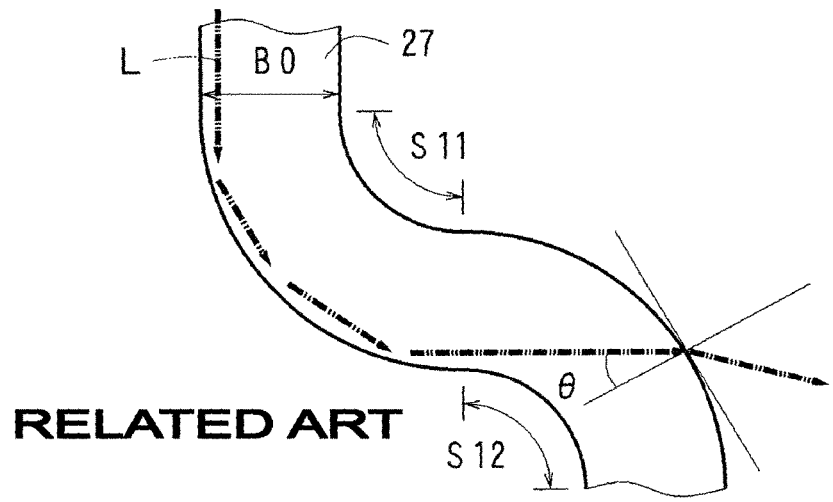
FIG. 17B is a schematic enlarged plan view of the S-shaped portion of FIG. 17A.

The graph of FIG. 16 shows that the light propagation loss in Experimental Example 1 is substantially constant independently of the length of the straight portion. The graph of FIG. 16 also shows that the light propagation loss in Experimental Example 2 tends to increase with the decreasing length of the straight portion when the length of the straight portion is not greater than 30 mm, and that the light propagation loss in Experimental Example 2 is substantially constant as in Experimental Example 1 when the length of the straight portion is greater than 30 mm. From these results, it is found to be effective in lowering the light propagation loss when the length of the straight portion is not greater than 30 mm that the width of the entrance of the second curved portion is smaller than the width of the core portion upstream of the S-shaped portion.

An optical waveguide in which a portion of each core was formed in an S-shape was produced with the use of new materials to be described below as an optical waveguide for an optical circuit board to be stacked on an electrical circuit board (with reference to FIGS. 12A and 12B).

[Material for Formation of First Cladding Layer and Second Cladding Layer]

Component g: 60 parts by weight of an epoxy resin (jER1001 available from Mitsubishi Chemical Corporation).

Component h: 30 parts by weight of an epoxy resin (EHPE3150 available from Daicel Corporation).

Component i: 10 parts by weight of an epoxy resin (EXA-4816 available from DIC Corporation).

Component j: 0.5 part by weight of a photo-acid generator (CPI-101A available from San-Apro Ltd.).

Component k: 0.5 part by weight of an antioxidant (Songnox1010 available from Kyodo Chemical Co., Ltd.).

Component l: 0.5 part by weight of an antioxidant (HCA available from Sanko Co., Ltd.).

Component m: 50 parts by weight of ethyl lactate (a solvent available from Wako Pure Chemical Industries, Ltd.).

A material for the formation of a first cladding layer and a second cladding layer was prepared by mixing these components g to m together.

[Material for Formation of Cores]

Component n: 50 parts by weight of an epoxy resin (YDCN-700-3 available from Nippon Steel & Sumikin Chemical Co., Ltd.).

Component o: 30 parts by weight of an epoxy resin (jER1001 available from Mitsubishi Chemical Corporation).

Component p: 20 parts by weight of an epoxy resin (OGSOL PG-100 available from Osaka Gas Chemicals Co., Ltd.).

Component q: 0.5 part by weight of a photo-acid generator (CPI-101A available from San-Apro Ltd.).

Component r: 0.5 part by weight of an antioxidant (Songnox1010 available from Kyodo Chemical Co., Ltd.).

Component s: 0.125 part by weight of an antioxidant (HCA available from Sanko Co., Ltd.).

Component t: 50 parts by weight of ethyl lactate (a solvent available from Wako Pure Chemical Industries, Ltd.).

A material for the formation of cores was prepared by mixing these components n to t together.

Inventive Examples 5 to 9

In the S-shaped portion in Inventive Examples 5 to 9, the width of the first curved portion S1 was decreased gradually from the entrance thereof toward the exit thereof, and the width B1 of the exit of the first curved portion S1 was smaller than the width B0 of the core portion upstream of the S-shaped portion (with reference to FIGS. 12C and 13). Then, the width B1 of the exit of the first curved portion S1, the radius of curvature R1 thereof and the like were set to a variety of values listed in TABLE 4 below. The width of the entrance of the first curved portion S1 was equal to the width B0 of the core portion upstream of the S-shaped portion. The width of the straight portion T (Inventive Examples 6 to 9) and the width of the second curved portion S2 were constant in the longitudinal direction thereof and were equal to the width B1 of the exit of the first curved portion S1. The radius of curvature of the second curved portion S2 was 0.5 mm in each of Inventive Examples 5 to 9. The first cladding layer had a thickness of 25 μm. The cores had a thickness (a height of protrusions from the lower surface of the first cladding layer) of 30 μm. The second cladding layer had a thickness of 70 μm as measured from the lower surface of the cores.

Comparative Examples 4 to 6

As listed in TABLE 4 below, the width of the first curved portion was decreased gradually from the entrance of the first curved portion toward the exit thereof in Comparative Example 4, and the width of the first curved portion was constant in the longitudinal direction thereof in Comparative Examples 5 and 6. The radius of curvature R1 and the like of the first curved portion S1 were set to a variety of values listed in TABLE 4 below. The remaining parts of Comparative Examples 4 to 6 were similar to those of Inventive Examples 5 to 9.

[Measurement of Light Propagation Loss]

Prepared were a graded index (GI) type multimode optical fiber (FFP-GI20-0500 available from Miki Inc.; a first optical fiber) having a diameter of 50 μm and connected to a VCSEL light source (OP250-LS-850-MM-50-SC available from Miki Inc.; having an emission wavelength of 850 nm), and a similar graded index (GI) type multimode optical fiber (a second optical fiber) having a diameter of 50 μm and connected to a photodetector (multimeter Q8221 available from Advantest Corporation). Then, the front end of the first optical fiber and the front end of the second optical fiber were brought into abutment with each other. The photodetector received light coming from the VCSEL light source to measure the intensity (H) of the received light.

Next, the front end of the first optical fiber was optically connected to a light reflecting surface (a light entrance portion) of a first end portion of one core in the optical waveguide of each of Inventive Examples 5 to 9 and Comparative Examples 4 to 6. The front end of the second optical fiber was optically connected to a light reflecting surface (a light exit portion) of a second end portion of the one core. In that state, the photodetector received light to measure the intensity (I) of the received light.

A light propagation loss (β) was calculated in accordance with Formula (5) below based on the measured intensities (H and I) of the received light, and was listed in TABLE 4 below.

[MATH. 8]

$$\beta = -10 \log_{10}(I/H) \quad (5)$$

TABLE 4

|  |  | Inventive Examples | | | | | Comparative Examples | | |
| --- | --- | --- | --- | --- | --- | --- | --- | --- | --- |
|  |  | 5 | 6 | 7 | 8 | 9 | 4 | 5 | 6 |
| First curved portion | Entrance width (μm) |  |  | 70 |  | 30 | 10 | 70 |  |
|  | Exit width B1 (μm) | 40 |  | 20 |  | 10 |  | 70 |  |
|  | Radius of curvature R1 (mm) | 3 |  | 2 | 1 | 0.5 | 5 |  | 4 |
|  | Difference in refractive index: K1 − K2 | 0.01 |  | 0.015 | 0.04 | 0.005 |  | 0.01 |  |
|  | B1/R1 | 13.3 |  | 10.0 | 20.0 | 2.0 | 14.0 |  | 17.5 |
|  | 800 × (K1 − K2) |  | 8.0 | 12.0 | 32.0 | 4.0 |  | 8.0 |  |
|  | Length of straight portion (mm) | 0 | 25 |  | 20 | 25 | 0 |  |  |
|  | Light propagation loss β (dB) | 14.5 | 8.1 | 4.1 | 6.3 | 7.0 |  | 18.9 | 20.1 |

The results in TABLE 4 show that the light propagation loss is low in Inventive Examples 5 to 9 as compared with that in Comparative Examples 4 to 6. From this, it is found to be effective in lowering the light propagation loss that the width B1 of the exit of the first curved portion of the S-shaped portion is smaller than the width B0 of the core portion upstream of the S-shaped portion. In particular, it is found that the light propagation loss is lower in Inventive Examples 7 to 9 which satisfy Formula (3) above.

Results having tendencies similar to those in Inventive Examples 5 to 9 were obtained when the optical waveguide in which a portion of each core was formed in an S-shape in each of Inventive Examples 1 to 4 was used as an optical waveguide for an optical circuit board as in Inventive Examples 5 to 9.

Although specific forms in the present disclosure have been described in the aforementioned examples, the aforementioned examples should be considered as merely illustrative and not restrictive. It is contemplated that various modifications evident to those skilled in the art could be made without departing from the scope of the present disclosure.

The optical waveguide according to the present disclosure is usable for propagating light in the cores more properly, and may be used for optical communication applications. The optical waveguide according to the present disclosure is effective at reducing the light propagation loss for optical communication applications and at saving space for routing of the cores. The position sensor according to the present disclosure is usable for equalizing the intensity of light received by the light-receiving element while the input region is not pressed. The optical circuit board according to the present disclosure is usable for suppressing the decrease in the intensity of light received by an optical member such as an optical element.

REFERENCE SIGNS LIST

W2 Optical waveguide
32 Cores
S1 First curved portion
S2 Second curved portion
B0 Width of upstream core portion
B1 Width of exit of first curved portion
B2 Width of entrance of second curved portion

The invention claimed is:

1. An optical waveguide comprising:
a linear core serving as an optical path; and
upper and lower cladding layers holding the core therebetween,
wherein the core is partially formed in an S-shape,
wherein the S-shaped portion includes a first curved portion upstream as seen in the direction of light propagation, and a second curved portion downstream as seen in the direction of light propagation and curved in a direction opposite to the first curved portion,
wherein the first curved portion and the second curved portion are connected to each other via a straight portion having a length in a range of from 0 mm to 30 mm,
wherein one of the width of the exit of the first curved portion and the width of the entrance of the second curved portion is smaller than the width of a core portion upstream of the S-shaped portion, and
wherein all of the first curved portion, the second curved portion, the straight portion and the core portion upstream of the S-shaped portion are formed of a same material.

2. The optical waveguide according to claim 1,
wherein the width of the entrance of the second curved portion is smaller than the width of the core portion upstream of the S-shaped portion, and
wherein a relationship between the width B2 of the entrance of the second curved portion, the radius of curvature R2 of the second curved portion, the refractive index K1 of the core with the S-shaped portion formed therein, and the refractive index K2 of one of the cladding layers which covers the side surface of the core satisfies Formula (1):

[MATH. 1]

$$B2/R2 \leq 800 \times (K1-K2) \quad (1)$$

where B2 is in μm, and R2 is in mm.

3. The optical waveguide according to claim 2,
wherein the relationship between the width B2 of the entrance of the second curved portion, the radius of curvature R2 of the second curved portion, the refractive index K1 of the core with the S-shaped portion formed therein, and the refractive index K2 of one of the cladding layers which covers the side surface of the core satisfies Formula (2):

[MATH. 2]

$$B2/R2 \leq 800 \times (K1-K2) - 4 \quad (2)$$

where B2 is in μm, and R2 is in mm.

4. The optical waveguide according to claim 1,
wherein the width of the entrance of the second curved portion is smaller than the width of the core portion upstream of the S-shaped portion,
wherein the width of the first curved portion decreases gradually from the entrance of the first curved portion toward the exit thereof,
wherein the width of the straight portion and the width of the second curved portion are constant in the longitudinal direction thereof, and
wherein the width of the exit of the first curved portion, the width of the straight portion, and the width of the second curved portion are equal to each other.

5. The optical waveguide according to claim 1,
wherein the width of the entrance of the second curved portion is smaller than the width of the core portion upstream of the S-shaped portion,
wherein the width of the first curved portion, the width of the straight portion, and the width of the second curved portion are constant in the longitudinal direction thereof,
wherein the width of the first curved portion is greater than the width of the second curved portion,
wherein the width of the straight portion and the width of the second curved portion are equal to each other, and
wherein the entrance of the straight portion is disposed in part of the exit of the first curved portion which corresponds to the outside of the curve of the first curved portion as seen in the width direction.

6. The optical waveguide according to claim 1,
wherein the width of the entrance of the second curved portion is smaller than the width of the core portion upstream of the S-shaped portion,
wherein the width of the first curved portion, the width of the straight portion, and the width of the second curved portion are constant in the longitudinal direction thereof,
wherein the width of the first curved portion is greater than the width of the second curved portion,
wherein the width of the first curved portion and the width of the straight portion are equal to each other, and
wherein the entrance of the second curved portion is disposed in part of the exit of the straight portion which corresponds to the outside of the curve of the first curved portion as seen in the width direction.

7. The optical waveguide according to claim 1,
wherein the width of the entrance of the second curved portion is smaller than the width of the core portion upstream of the S-shaped portion,
wherein the width of the first curved portion and the width of the second curved portion are constant in the longitudinal direction thereof,
wherein the width of the first curved portion is greater than the width of the second curved portion,
wherein the width of the entrance of the straight portion is equal to the width of the first curved portion, and
wherein the width of the exit of the straight portion is equal to the width of the second curved portion.

8. The optical waveguide according to claim 1,
wherein the width of the entrance of the second curved portion is smaller than the width of the core portion upstream of the S-shaped portion, and
wherein all of the width of the first curved portion, the width of the straight portion, and the width of the second curved portion are constant and equal in the longitudinal direction thereof.

9. The optical waveguide according to claim 1,
wherein the width of the exit of the first curved portion is smaller than the width of the core portion upstream of the S-shaped portion, and wherein a relationship between the width B1 of the exit of the first curved portion, the radius of curvature R1 of the first curved portion, the refractive index K1 of the core with the S-shaped portion formed therein, and the refractive index K2 of one of the cladding layers which covers the side surface of the core satisfies Formula (3):

[MATH. 3]

$$B1/R1 \leq 800 \times (K1-K2) \quad (3)$$

where B1 is in µm, and R1 is in mm.

10. The optical waveguide according to claim 1,
wherein the width of the exit of the first curved portion is smaller than the width of the core portion upstream of the S-shaped portion,
wherein the width of the first curved portion decreases gradually from the entrance of the first curved portion toward the exit thereof,
wherein the width of the straight portion and the width of the second curved portion are constant in the longitudinal direction thereof, and
wherein the width of the exit of the first curved portion, the width of the straight portion, and the width of the second curved portion are equal to each other.

11. A position sensor comprising:
a sheet-like optical waveguide including a sheet-like core pattern member, and upper and lower sheet-like cladding layers holding the core pattern member therebetween,
the sheet-like core pattern member including a lattice-shaped portion having a plurality of linear cores, a first outer peripheral core portion positioned on a first horizontal side and a first vertical side of an outer periphery of the lattice-shaped portion and optically connected to front ends of respective vertical cores of the lattice-shaped portion and to front ends of respective horizontal cores of the lattice-shaped portion, and a second outer peripheral core portion positioned on and extending along a second horizontal side and a second vertical side which are opposed respectively to the first horizontal side and the first vertical side, with the lattice-shaped portion therebetween, and extending from rear ends of the respective vertical cores of the lattice-shaped portion and from rear ends of the respective horizontal cores of the lattice-shaped portion;
a light-emitting element connected to an end surface of the first outer peripheral core portion of the optical waveguide; and
a light-receiving element connected to an end surface of the second outer peripheral core portion,
wherein part of the optical waveguide corresponding to at least a portion of the second outer peripheral core portion is an optical waveguide as recited in claim 1,
wherein light emitted from the light-emitting element passes through the first outer peripheral core portion, the lattice-shaped portion and the second outer peripheral core portion, and is received by the light-receiving element,
wherein a surface portion of the position sensor corresponding to the lattice-shaped portion of the core pattern member serves as an input region, and
wherein a pressed position in the input region is determined based on the amount of light propagating in the cores which is varied by the pressing.

12. An optical circuit board comprising:
an optical waveguide as recited in claim 1; and
an optical member optically connected to an end portion of the core of the optical waveguide.

* * * * *